US012585039B2

(12) United States Patent
Leininger

(10) Patent No.: US 12,585,039 B2
(45) Date of Patent: Mar. 24, 2026

(54) SYSTEM AND METHOD FOR UXO DETECTION

(71) Applicant: Arrotech Corporation, Panama City Beach, FL (US)

(72) Inventor: Tobias Leininger, Waakirchen (DE)

( * ) Notice: Subject to any disclaimer, the term of this patent is extended or adjusted under 35 U.S.C. 154(b) by 257 days.

(21) Appl. No.: 18/388,874

(22) Filed: Nov. 13, 2023

(65) Prior Publication Data

US 2025/0376277 A1 Dec. 11, 2025

Related U.S. Application Data

(60) Provisional application No. 63/532,788, filed on Aug. 15, 2023.

(51) Int. Cl.
| | |
|---|---|
| *G01V 3/16* | (2006.01) |
| *B64F 5/10* | (2017.01) |
| *B64U 20/83* | (2023.01) |
| *B64U 101/15* | (2023.01) |
| *F42D 5/02* | (2006.01) |
| *G01S 19/43* | (2010.01) |
| *G01V 3/08* | (2006.01) |
| *G01V 3/165* | (2006.01) |

(52) U.S. Cl.
CPC .................. *G01V 3/16* (2013.01); *B64F 5/10* (2017.01); *B64U 20/83* (2023.01); *F42D 5/02* (2013.01); *G01S 19/43* (2013.01); *G01V 3/08* (2013.01); *G01V 3/165* (2013.01); *B64U 2101/15* (2023.01)

(58) Field of Classification Search
CPC ......... G01V 3/16; B64U 10/14; B64C 39/024
See application file for complete search history.

(56) References Cited

U.S. PATENT DOCUMENTS

| | | | | | |
|---|---|---|---|---|---|
| 8,358,135 | B2 * | 1/2013 | Kuzmin | ................. | G01V 3/165 324/330 |
| 11,485,518 | B2 * | 11/2022 | Ratajczak | ................ | G08G 5/55 |
| 2004/0051619 | A1 * | 3/2004 | Bryan | ...................... | G01V 3/17 336/192 |
| 2010/0237870 | A1 * | 9/2010 | Dodds | .................... | G01V 11/00 324/331 |
| 2011/0115489 | A1 * | 5/2011 | Morrison | ............... | G01V 3/165 324/330 |

(Continued)

FOREIGN PATENT DOCUMENTS

| | | | | | |
|---|---|---|---|---|---|
| CN | | 112415612 B | * | 5/2024 | ............. G01V 3/16 |
| DE | 102019007678 | A1 | * | 5/2021 | ............. G01V 3/165 |

OTHER PUBLICATIONS

CN-112415612-B Translation (Year: 2024).*
DE-102019007678-A1 Translation (Year: 2021).*

*Primary Examiner* — Michael W Hotchkiss
(74) *Attorney, Agent, or Firm* — Chris Tanner; BlueCollarIP.com

(57) ABSTRACT

A system and method for detecting, locating, and removing UXO is disclosed. The system uses a drone-device equipped with a metal detector that fully integrates military-grade metal detection capability. The system flies terrain with centimeter precision using onboard LIDAR, SONAR, and RADAR sensors at altitudes as low as 20 cm. The system achieves exact RTK GPS pinpoint location of targets within centimeters. The system also provides numerous mission-planning GUIs for tablets and smartphones.

14 Claims, 33 Drawing Sheets

(uneven terrain)

(56)          References Cited

U.S. PATENT DOCUMENTS

| 2013/0047701 | A1* | 2/2013 | Peltz | G01V 11/00 |
| | | | | 73/23.2 |
| 2014/0339355 | A1* | 11/2014 | Olm | B64U 60/50 |
| | | | | 244/17.23 |
| 2019/0033441 | A1* | 1/2019 | Gonzáles Valdés | B64U 10/13 |
| 2019/0144115 | A1* | 5/2019 | Chen | B64C 25/32 |
| | | | | 244/118.1 |
| 2021/0033745 | A1* | 2/2021 | Døssing Andreasen | G01V 3/40 |
| 2021/0309357 | A1* | 10/2021 | Ratajczak | B60L 53/80 |
| 2022/0074712 | A1* | 3/2022 | Oh | F42D 5/04 |
| 2023/0331386 | A1* | 10/2023 | Parraga | B64D 1/08 |
| 2024/0319399 | A1* | 9/2024 | Saneiyan | G01V 3/087 |
| 2025/0060504 | A1* | 2/2025 | Leininger | G01V 3/165 |

* cited by examiner

UAV 104 center-core 112 — flight controller 116
modem 120
remote control (RC) receiver 124
GPS unit 128
front sensor hub 132
main battery 136

— detector 108

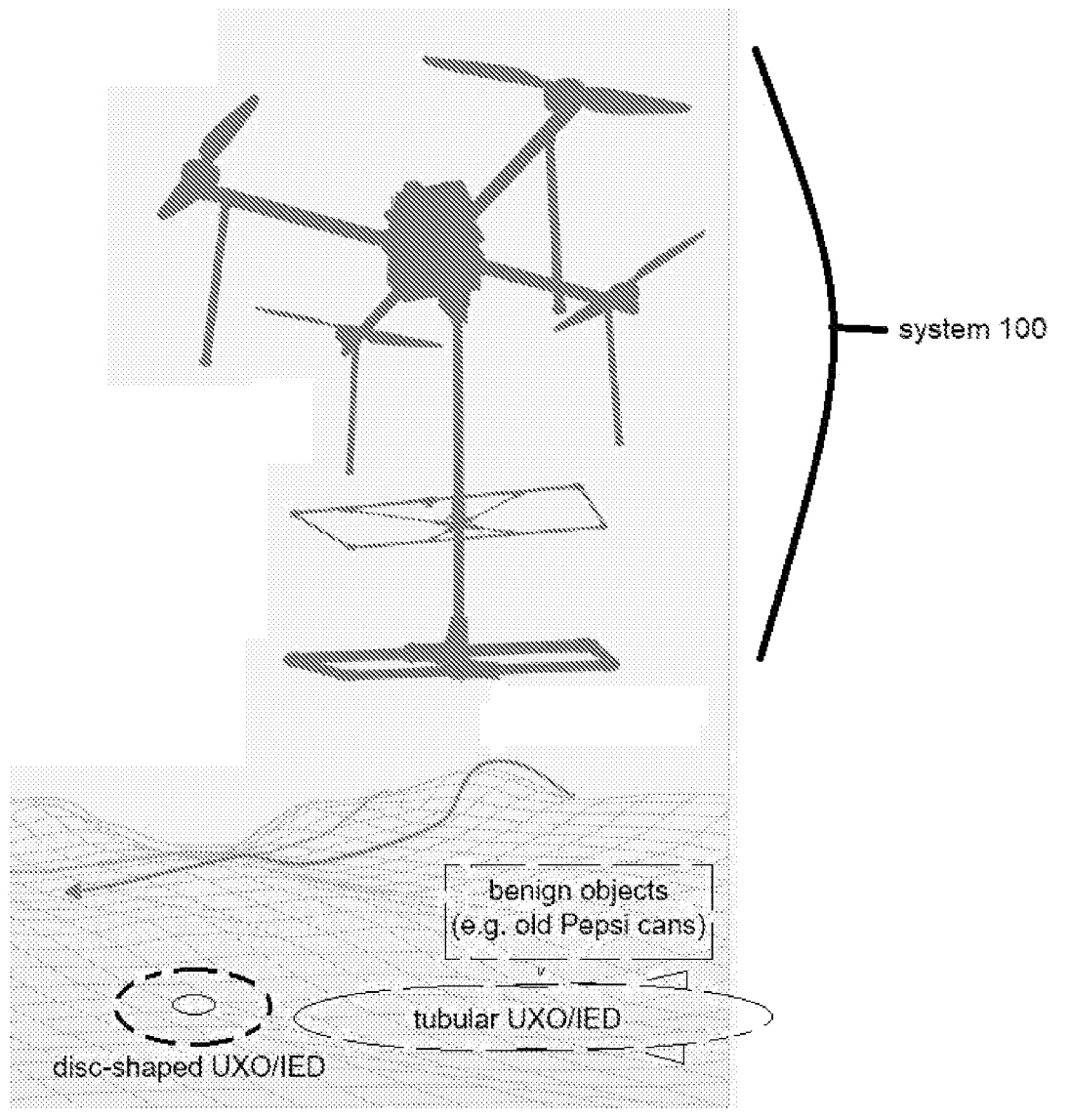
FIG. 1C (uneven terrain)

arms 204 plates
(incomplete)

motors 208

X-pattern 224 upper plate 1300 middle plate 600 lower plate 250

FRONT

BACK

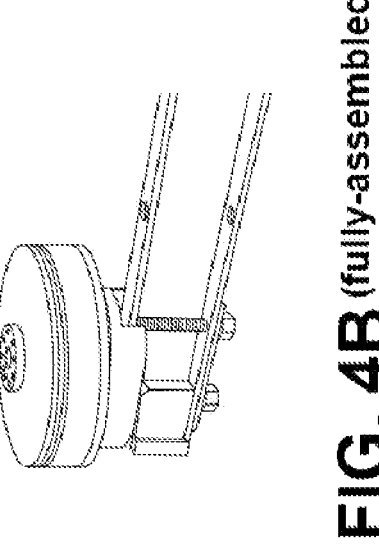
FIG. 4B (fully-assembled)
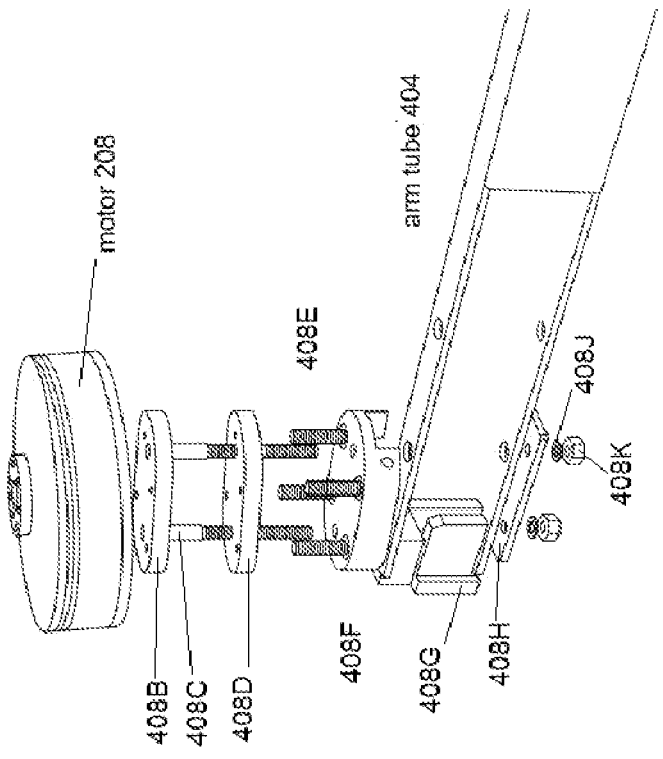
FIG. 4A (exploded view)

grounding PCB 500 arms 204 legs 1000 motors 208 communication-cube 1200 carrier
board 1204 top plate 1300

RC receiver 124 rail 1504

UAV 104 coils control
box 2012 upper coil 2004 lower coil 2008 detector 108 rodclamp 2212 winch-mount 2104 tube 2204 rod center mount 2208 cablecover 2704 side B

| Layers & Perimeters | |
|---|---|
| Layer height: | 0.15 mm |
| Perimeters: | 3 |
| Horizontal Shells: | Top: 3<br>Bottom: 3 |
| Infill Pattern: | Triangles |
| Connect Infill Lines: | Enable |
| Material | |
| Filament type and color: | PETG - Black |
| Nozzle temperature: | 240°C |
| First layer bed temperature: | 80°C |
| All other layers bed temperature: | 70°C |
| Speed | |
| Print Speed: | 50 mm/s |
| First Layer Speed: | 40 mm/s |
| Skirt/Brim Speed: | 20 mm/s |
| Support Speed: | 40mm/s |
| Travel Speed: | 130 mm/s |
| Support | |
| Only use when needed to support overhangs. | |
| Support Pattern: | Rectangular |

SYSTEM AND METHOD FOR UXO DETECTION

BACKGROUND OF THE INVENTION

Unexploded Ordnance (UXO) is a serious problem and threat to public safety. Unfortunately, UXO is very dangerous and difficult to detect and remove. Consequently, an improved mechanism for detecting and removing UXO is desired.

SUMMARY OF THE INVENTION

Fully integrates military-grade metal detection capability;

Flies terrain with centimeter precision using onboard LIDAR, SONAR, and RADAR sensors at altitudes as low as 20 cm;

Utilizes time domain metal detection (including non-ferromagnetic items);

Exact RTK GPS pinpoint location of targets within centimeters;

Mission Planning GUIs for tablets and smartphones;

Autonomous return and resume for battery changes (capable of mapping 10,000 square feet in 20 minutes);

Obstacle avoidance and non-geometric area mapping;

Live data transmission to ground control station;

Data is fully compatibile with numerous geophysical software formats; and

Uniquely designed to control electromagnetic noise thus resulting in increased detection \ visibility of targets e.g. UXO, other.

The embodiments herein utilize an autonomous UAV incorporating a custom time-domain metal detector, and is fully compatible with standard tools for UXO and mine detection. For the system to work effectively, maintaining a stable distance of UAV from ground is crucial. This feature leads to increased accuracy of the detector. The system is capable of precisely following real world terrain at distances as close as 20 cm, and is able to avoid obstacles in its flight path.

The system also cuts down UXO-survey times to a fraction of time needed for conventional survey methods currently being used for UXO and mine detection. Further, the system achieves this while improving accuracy, safety and cost effectiveness.

BRIEF DESCRIPTION OF THE DRAWINGS

FIG. 1C shows a possible non-limiting way of operating the system;

FIGS. 4A-4B show how to assemble various components into an aluminum tube;

2

Figure 9C:
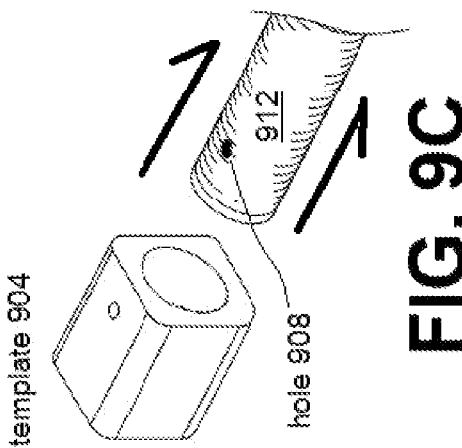
Figure 9B:
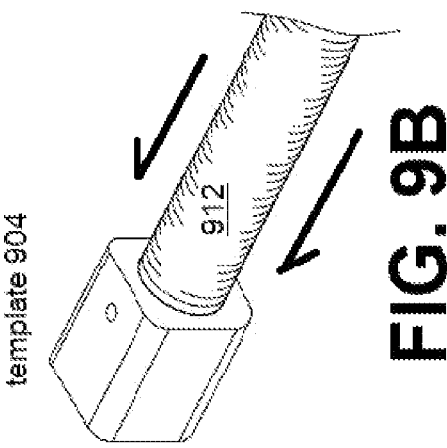
Figure 9A:
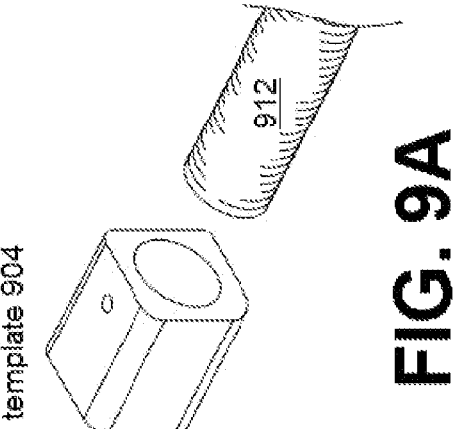
Figure 10A:
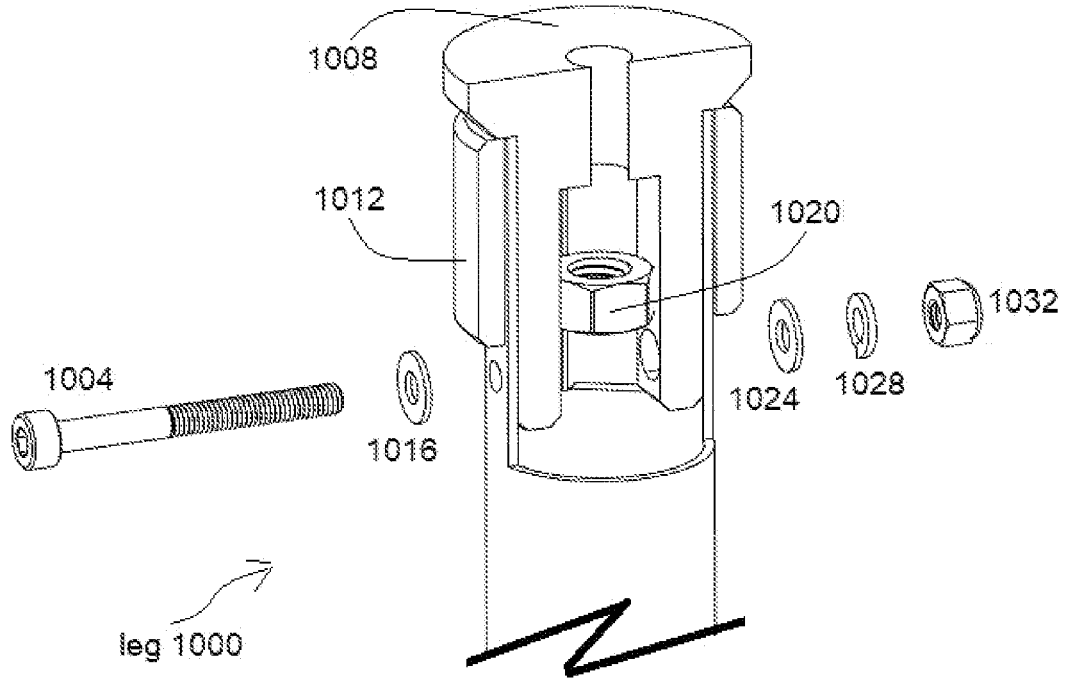
Figure 10B:
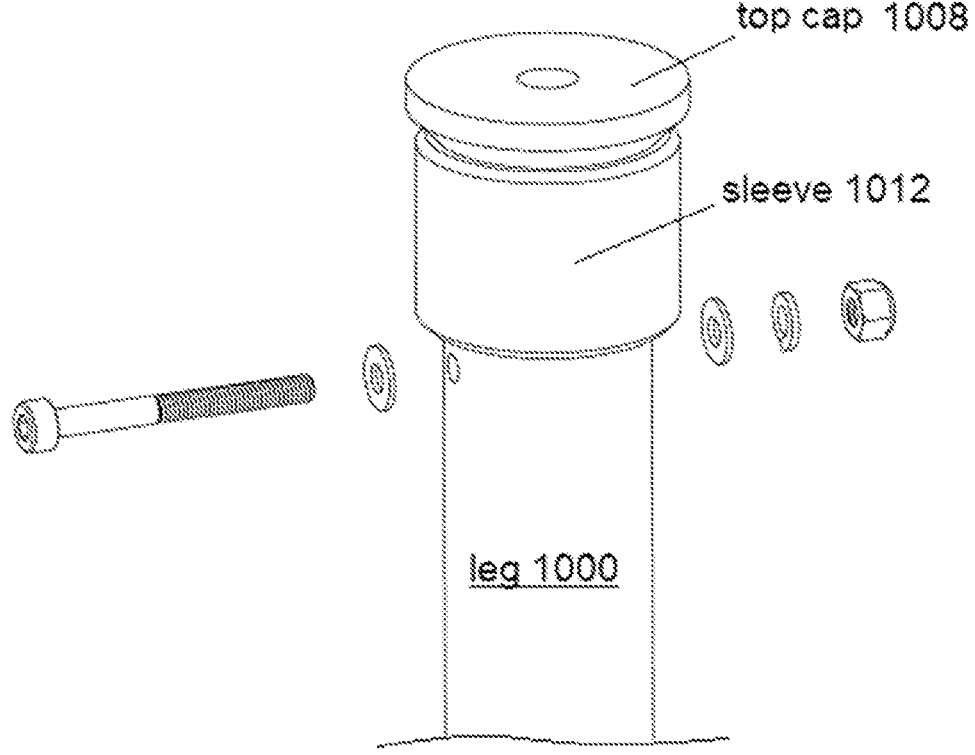
Figure 11:
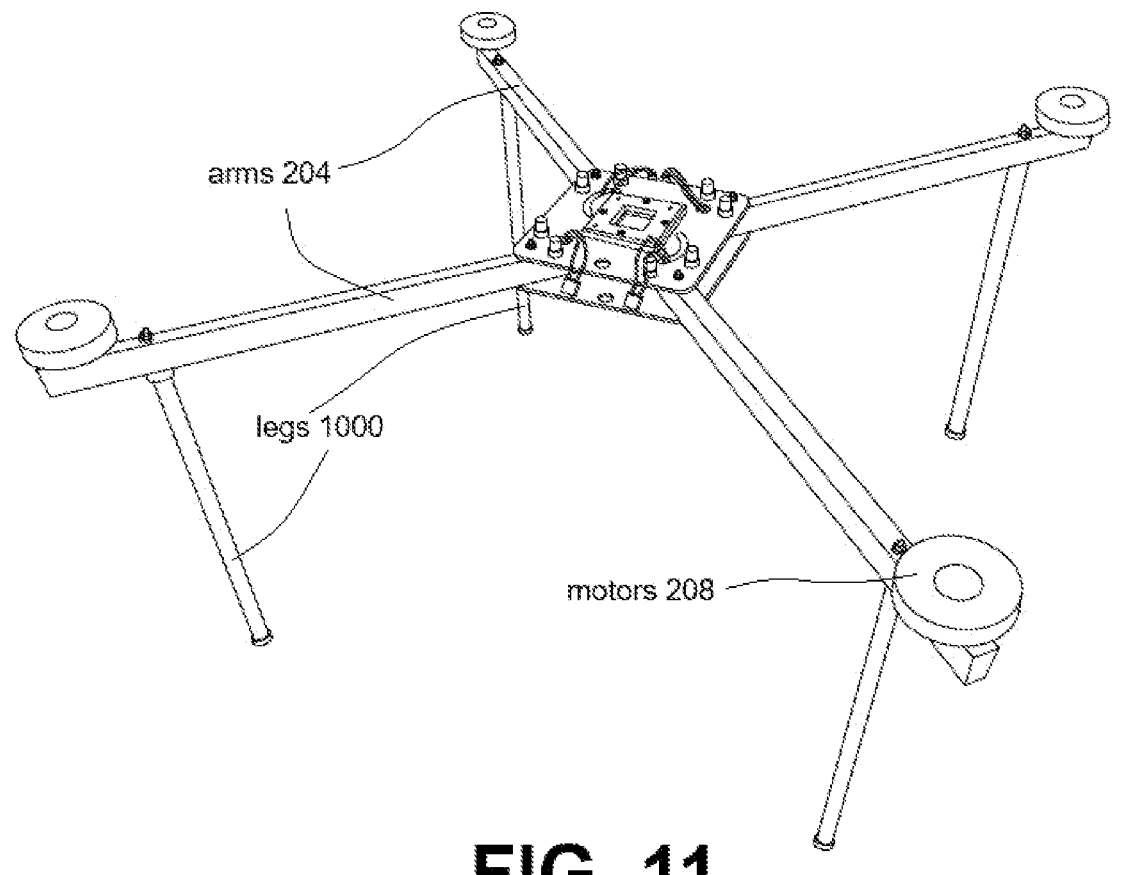
Figure 12:
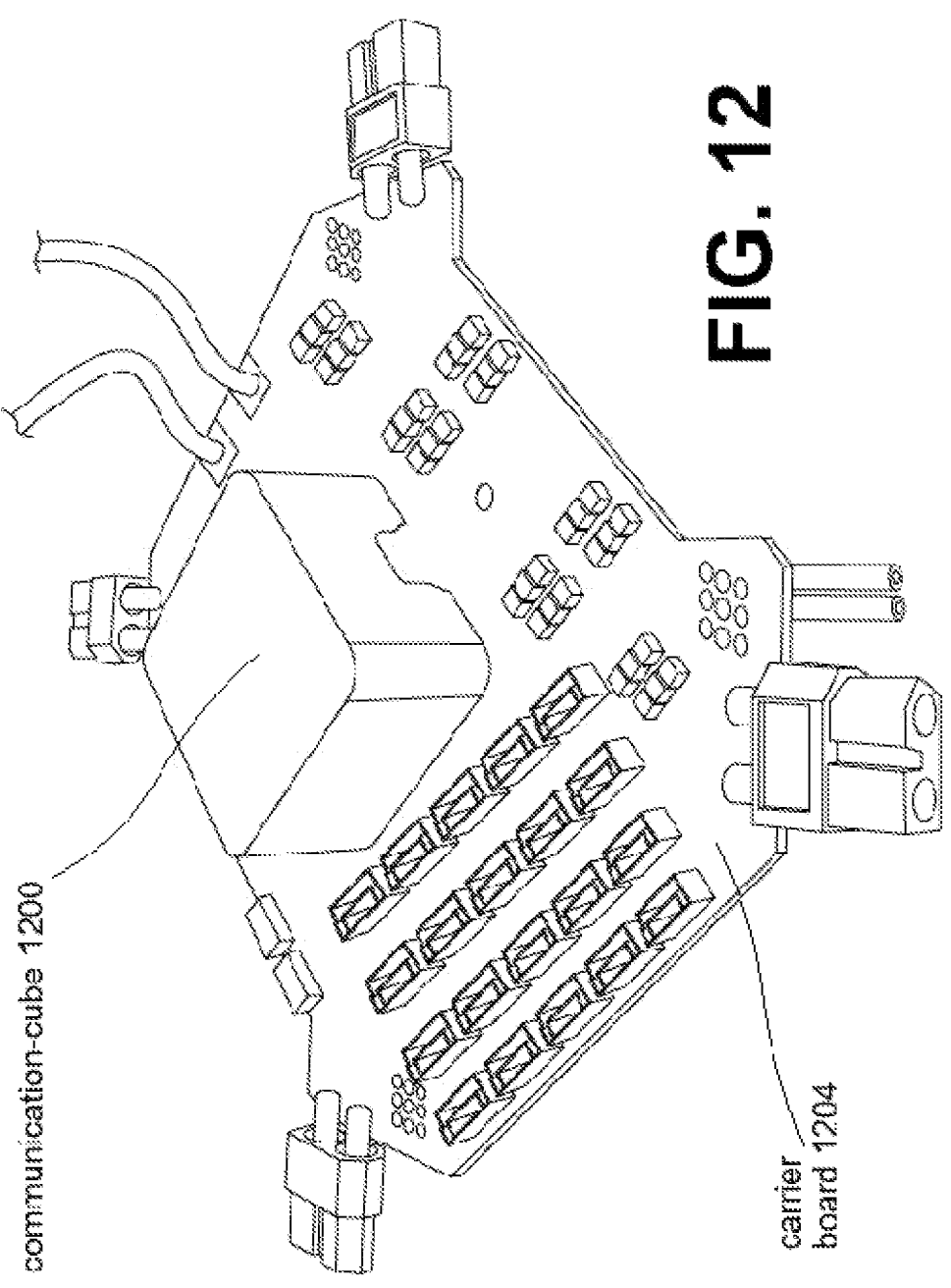
Figure 13:
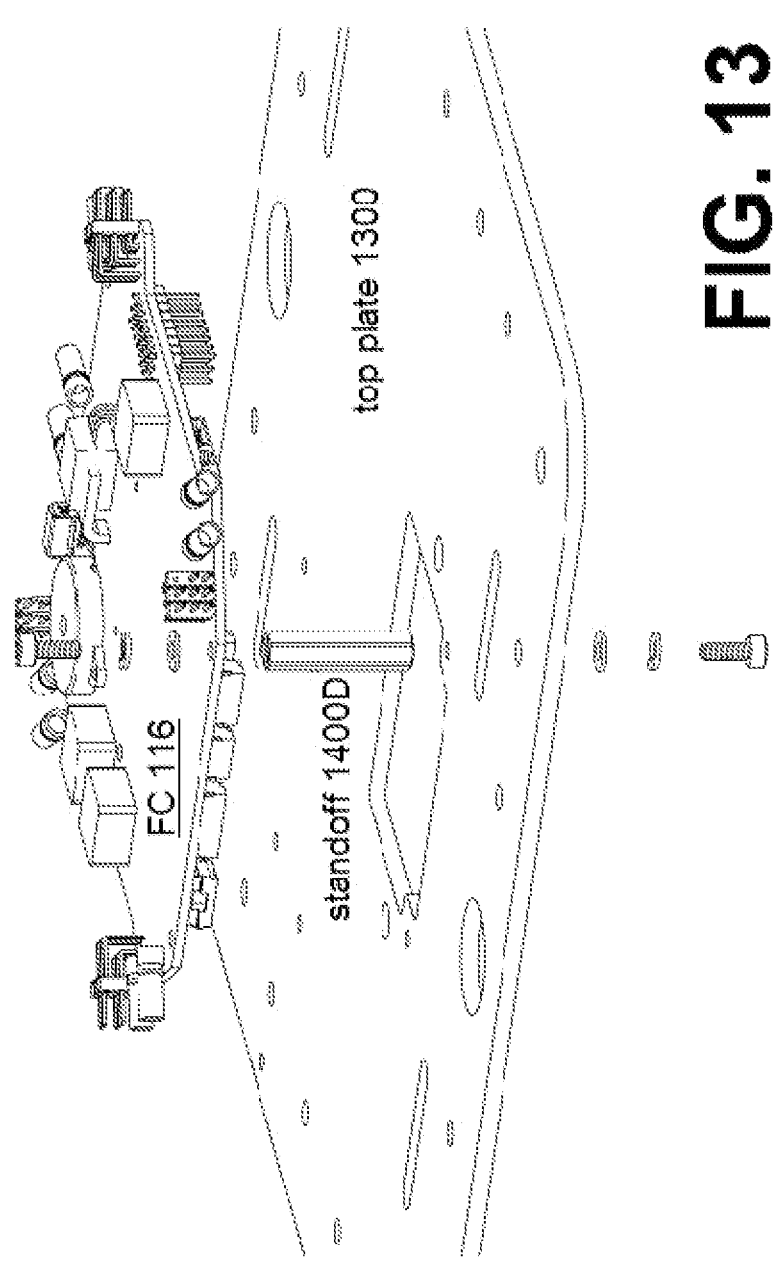
Figure 14:
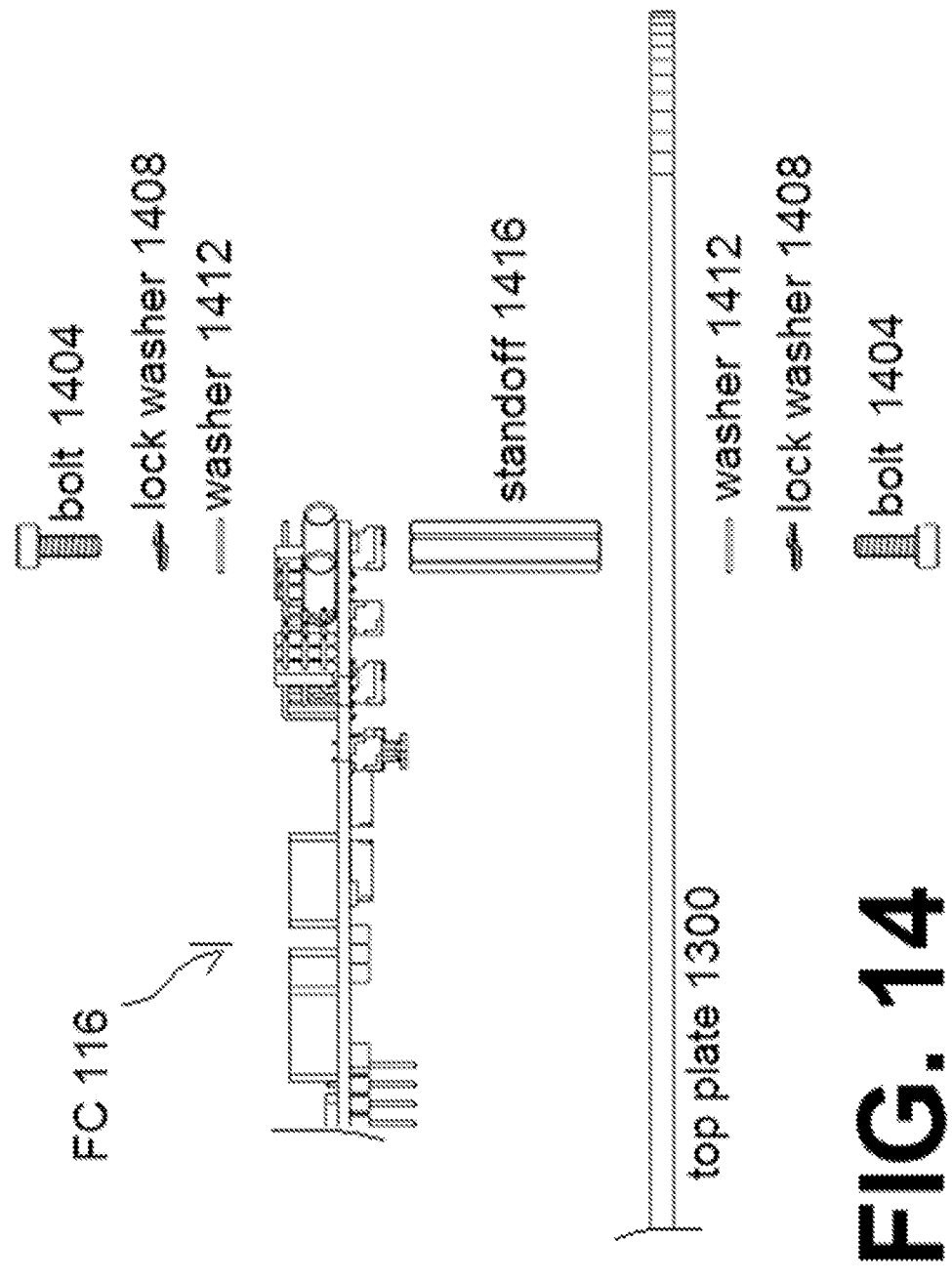
Figure 15:
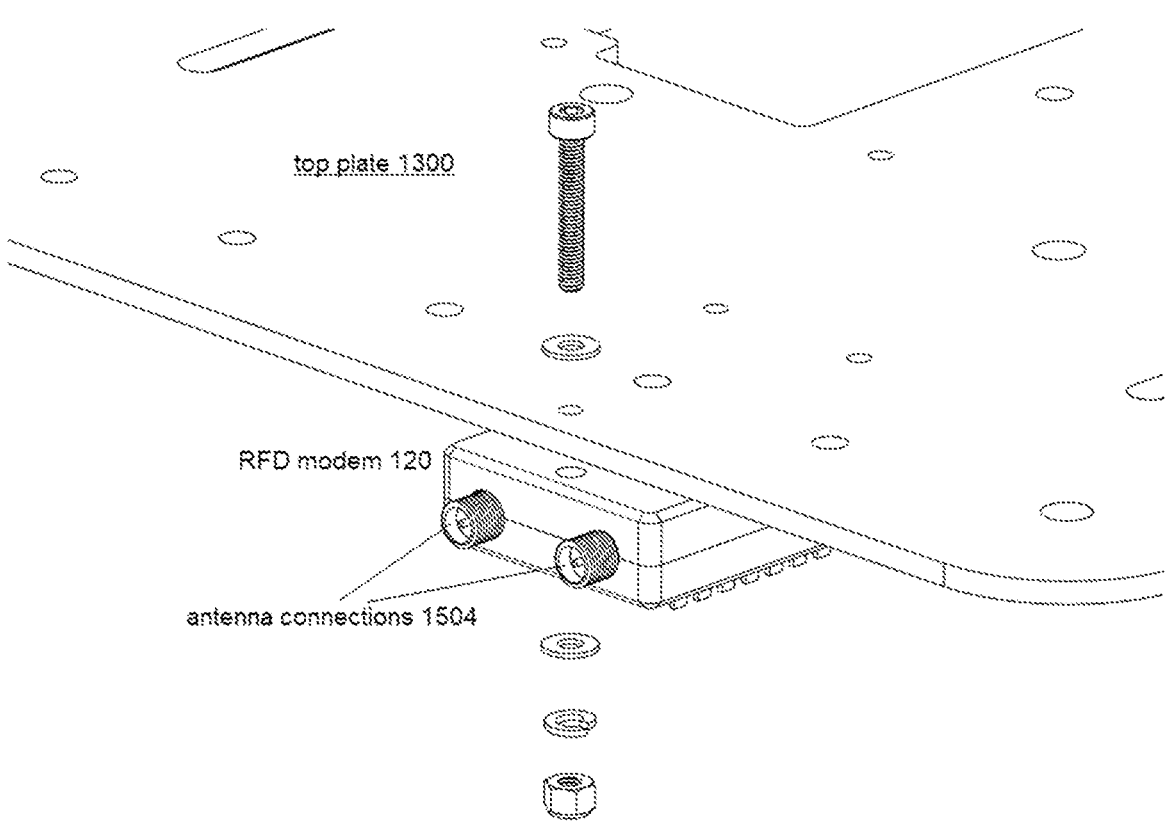
Figure 16:
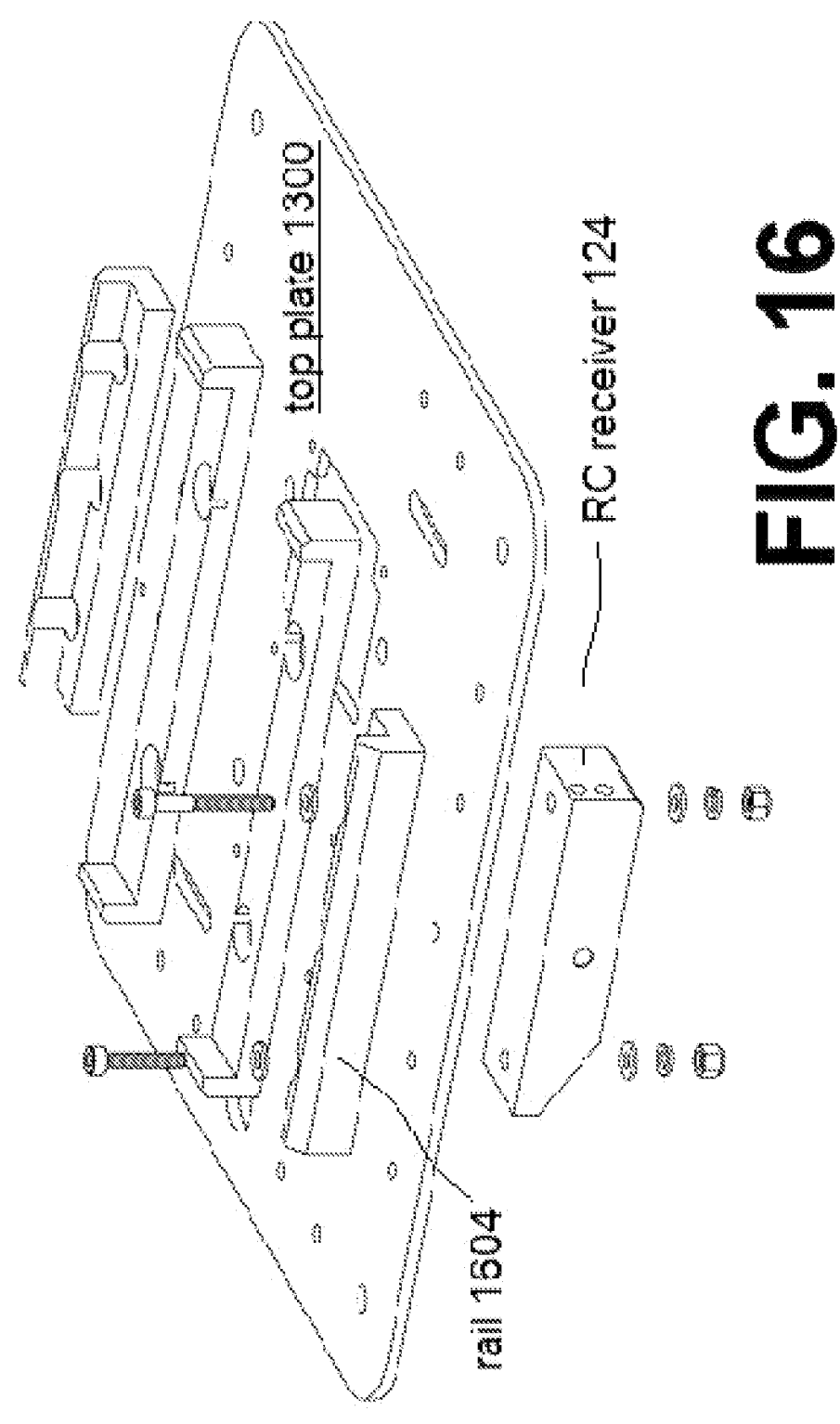
Figures 17A, 17B:
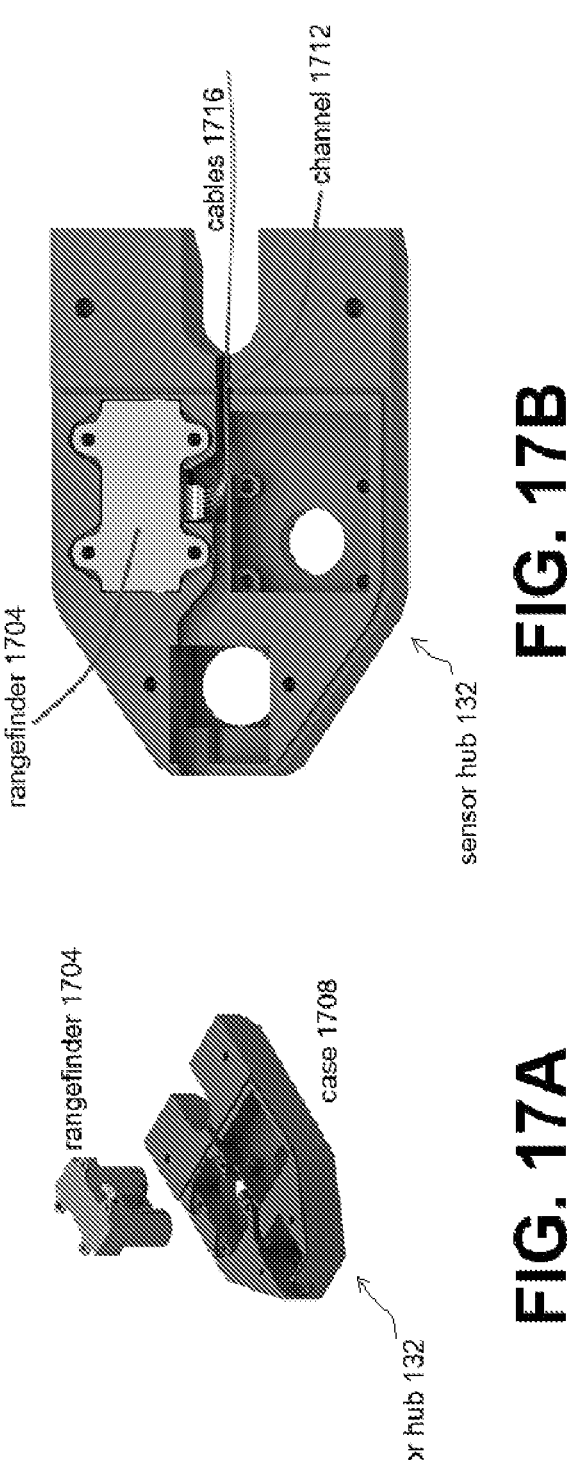
Figure 17C:
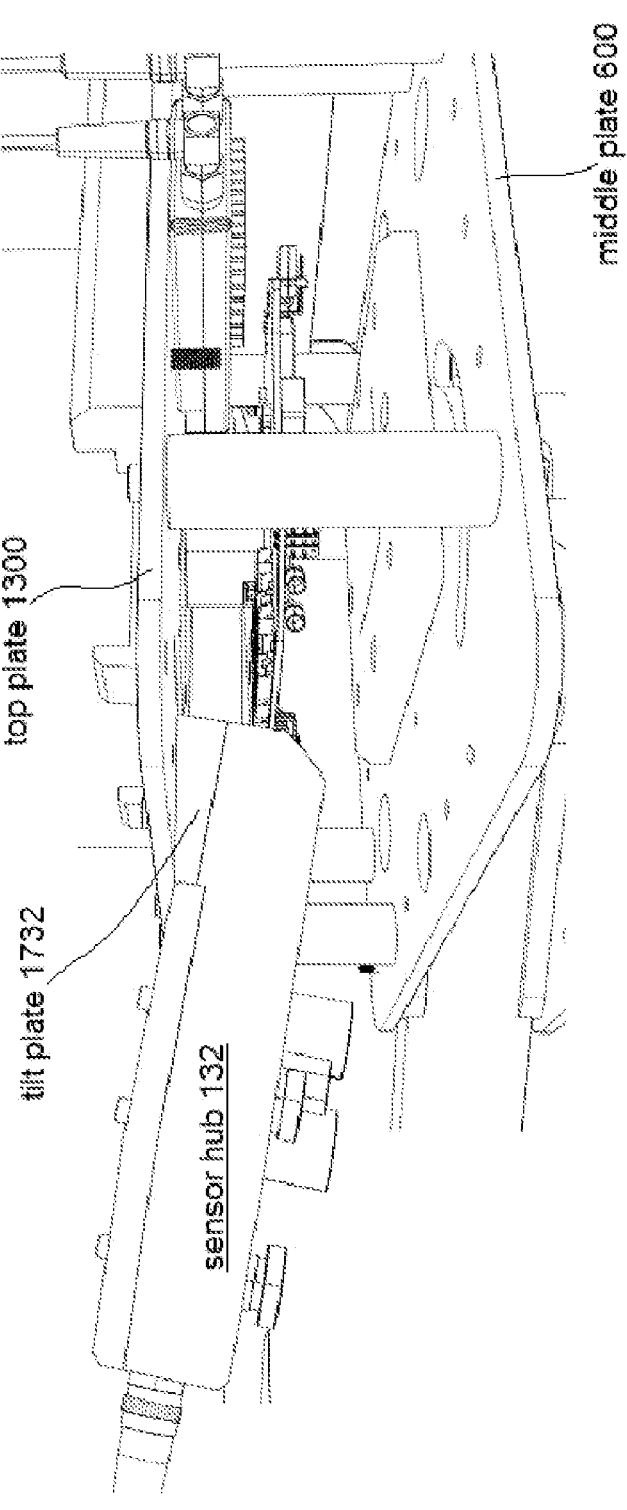
Figure 18:
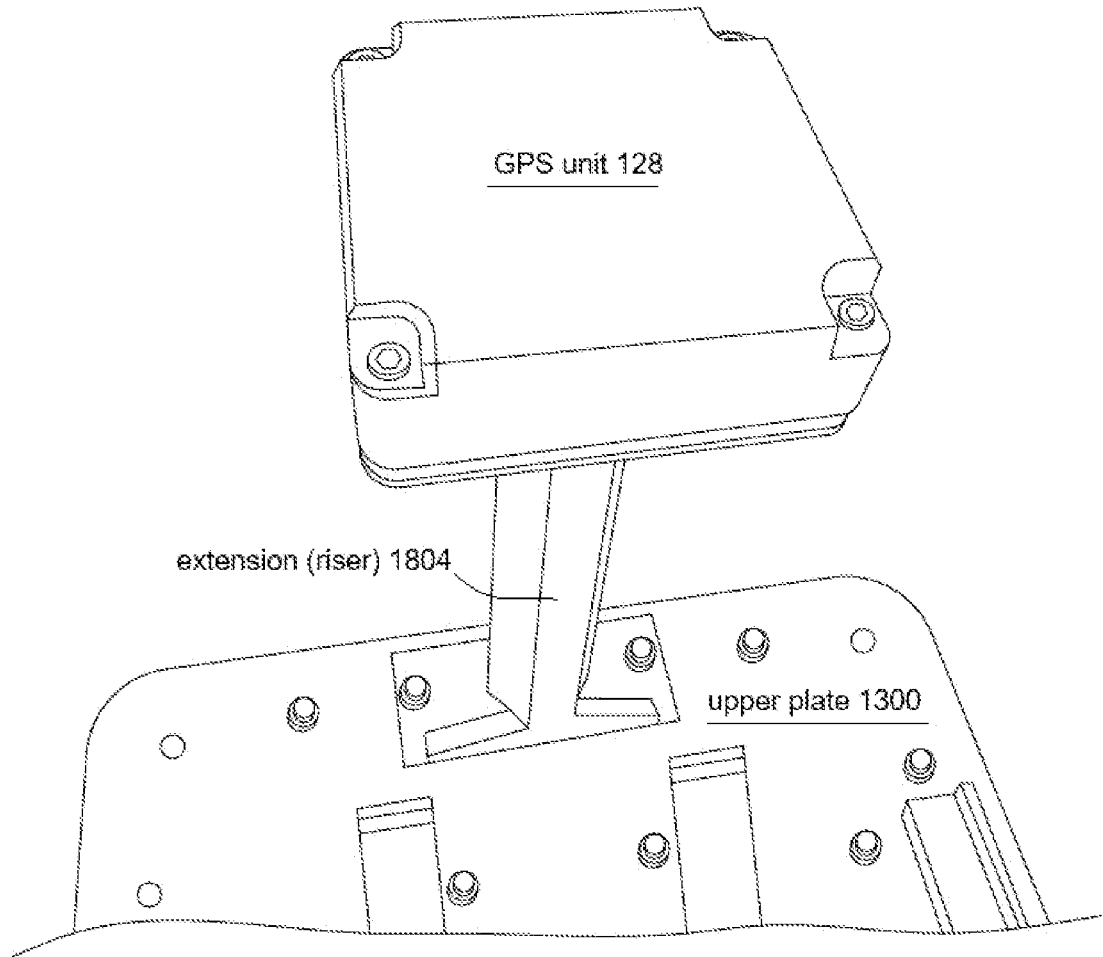
Figure 19:
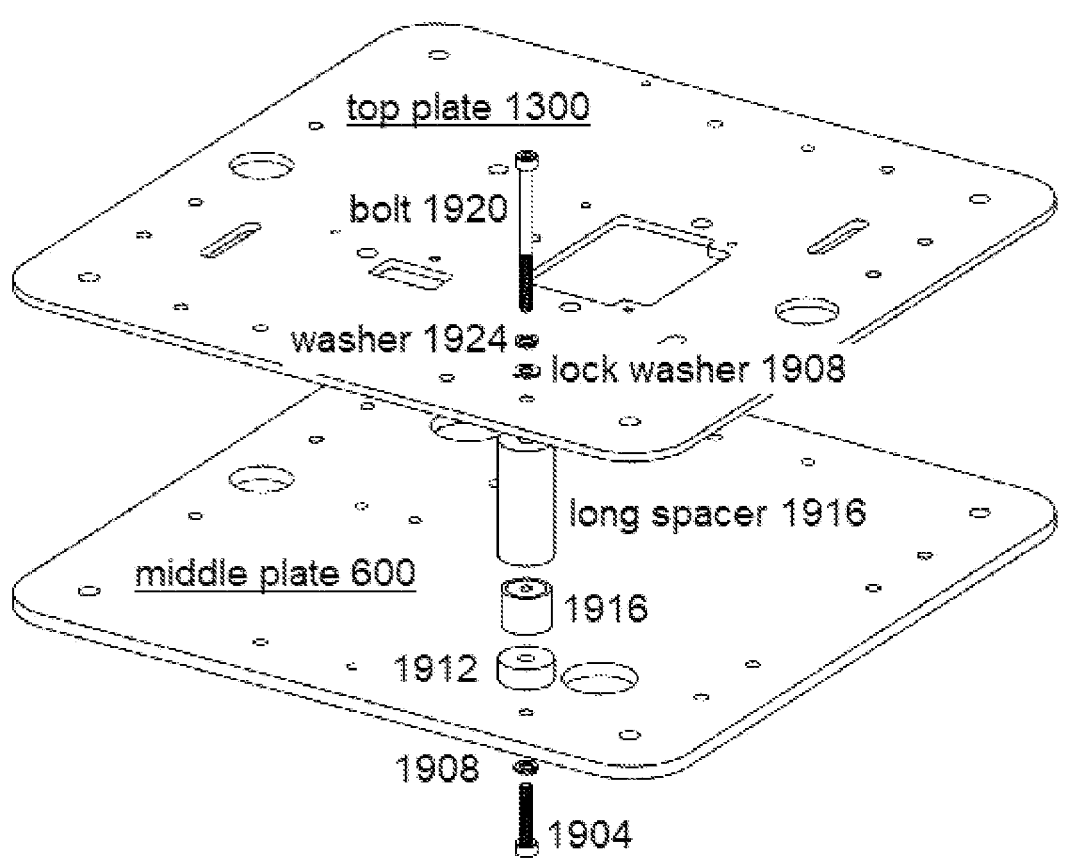
Figure 20:
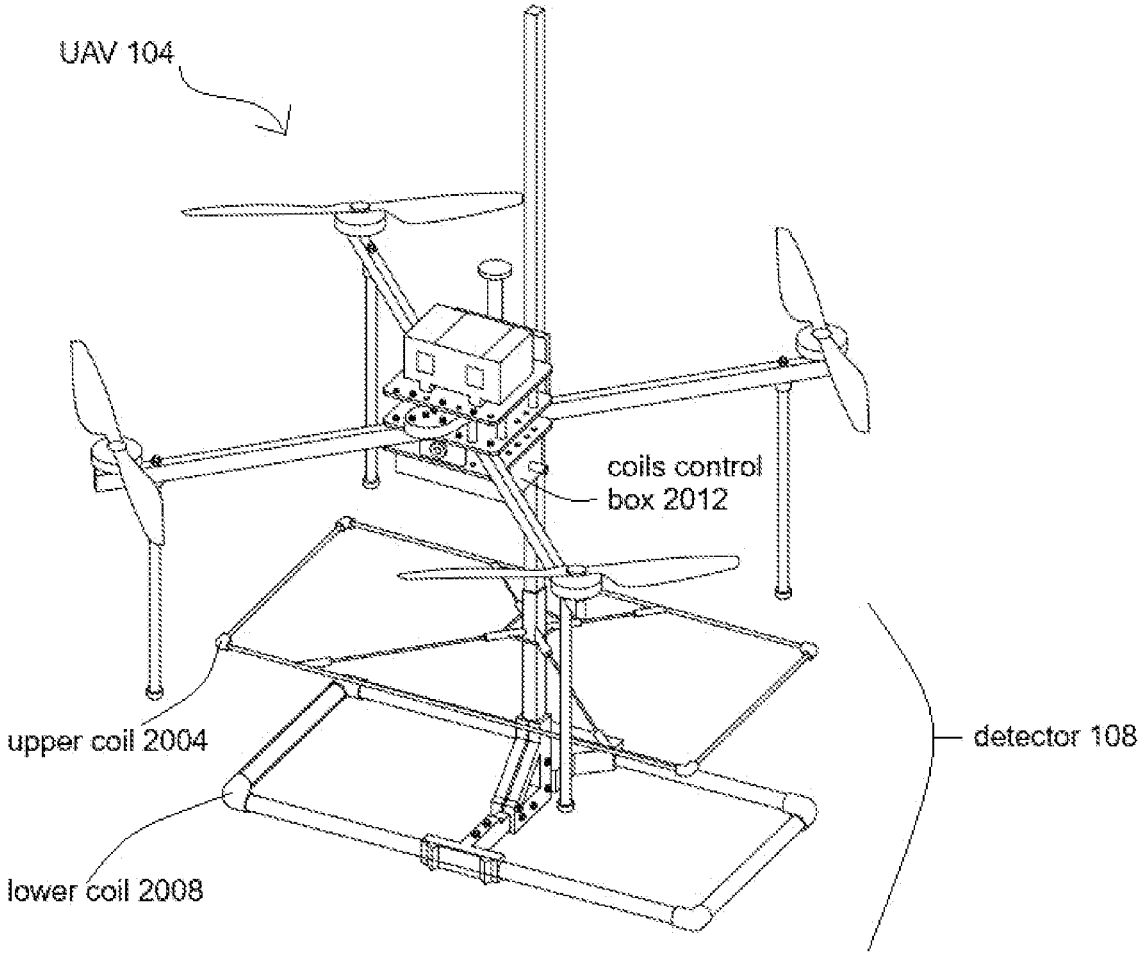
Figure 21:
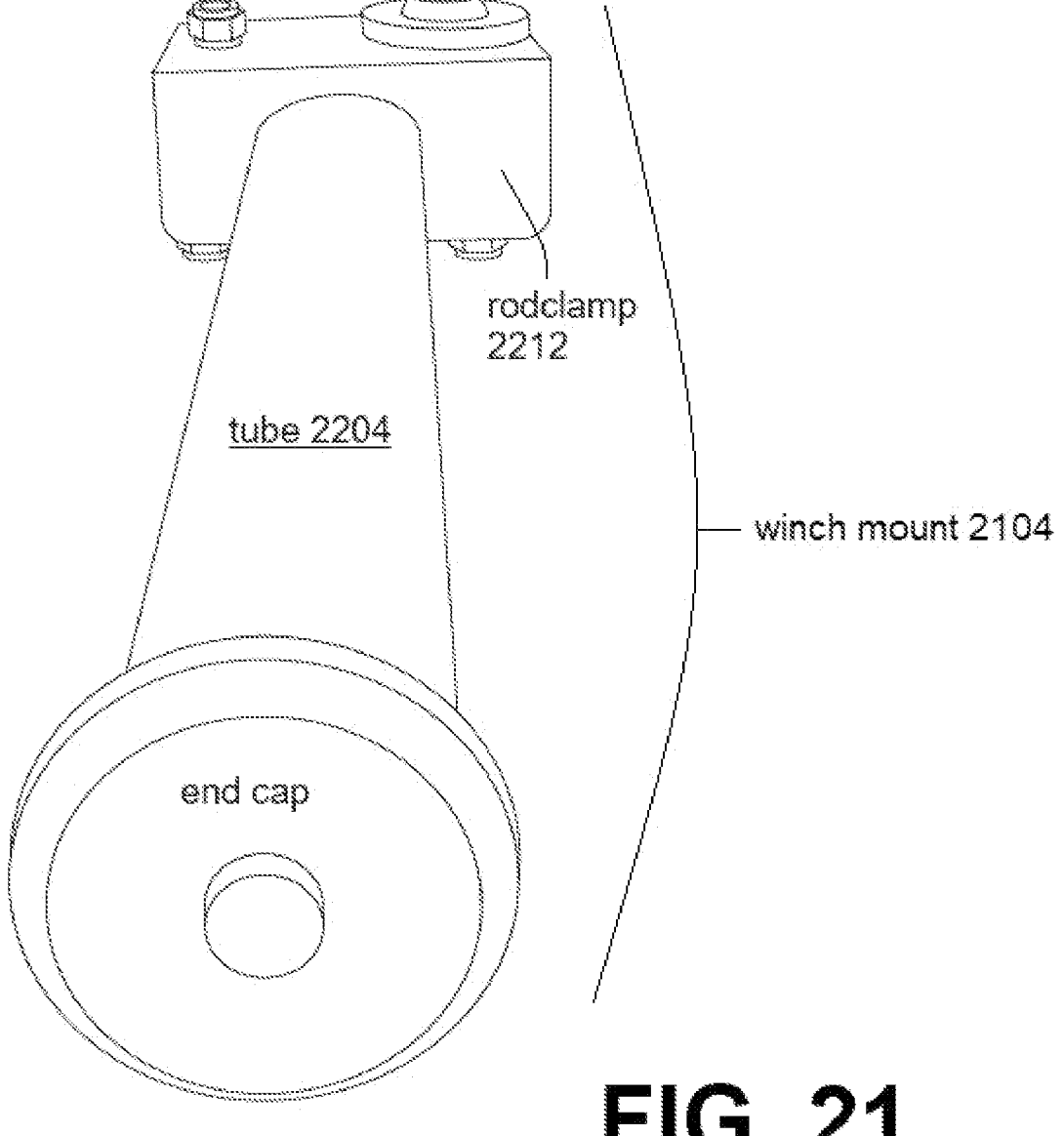
Figure 22:
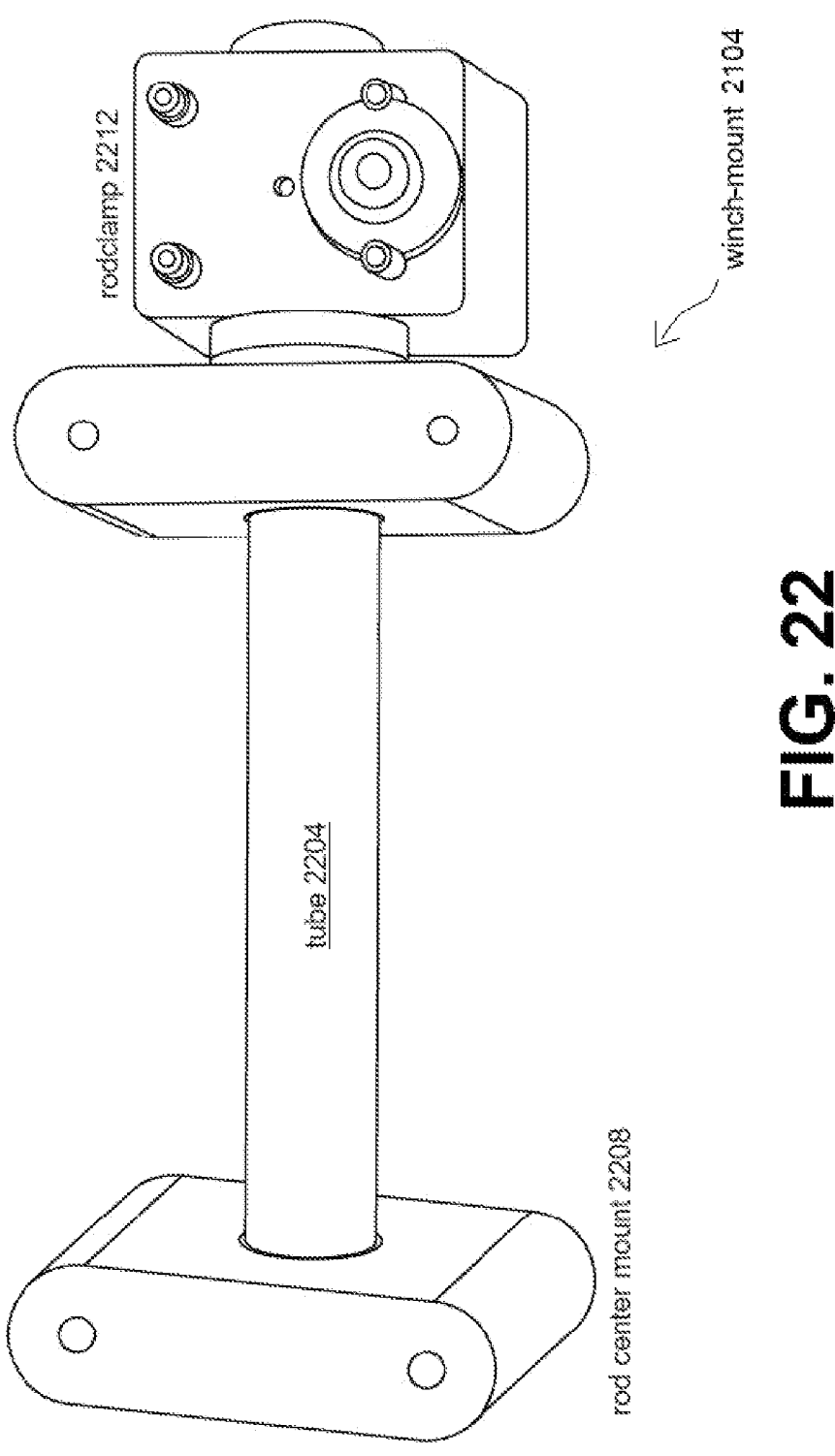
Figure 23:
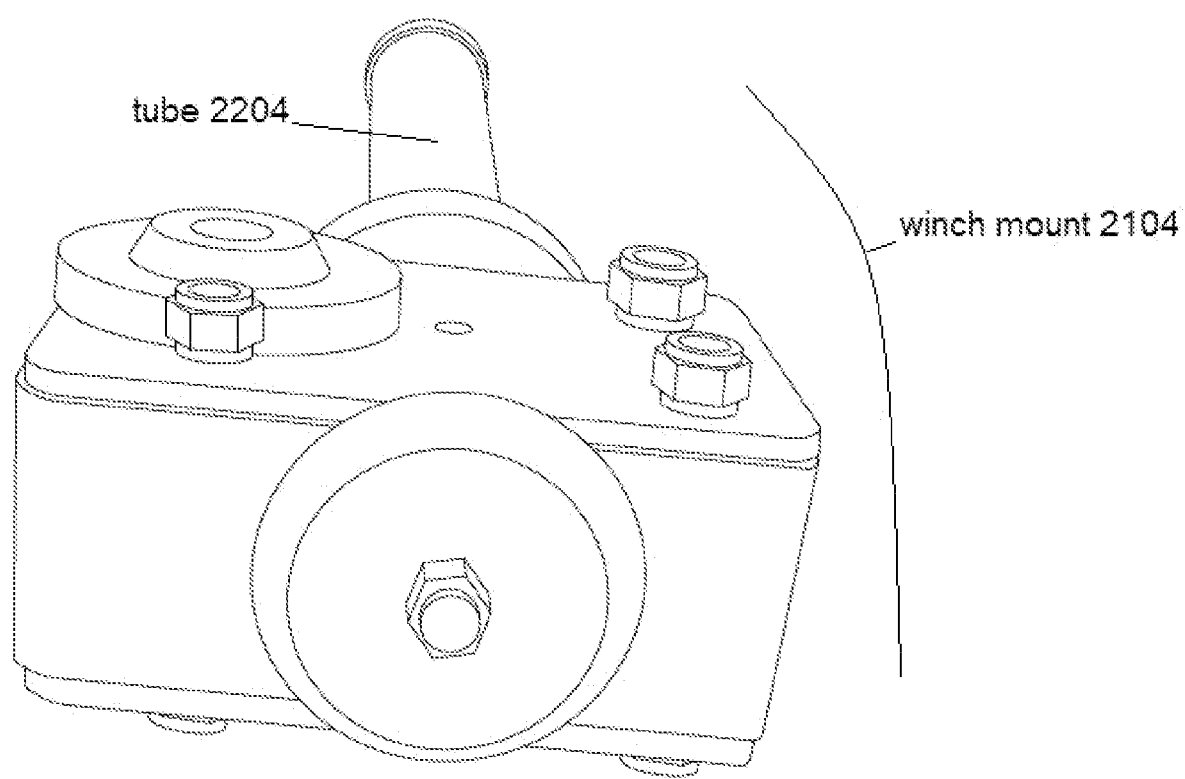
Figure 24:
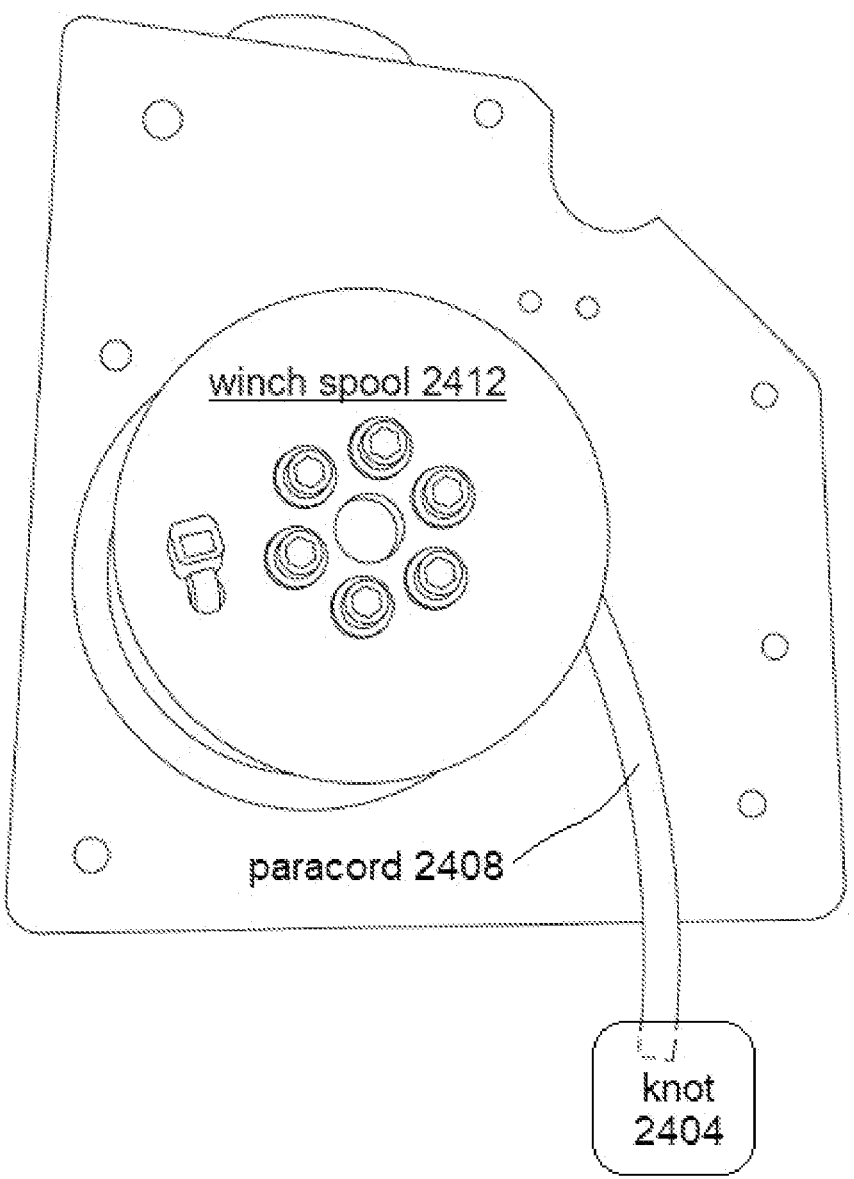
Figure 25:
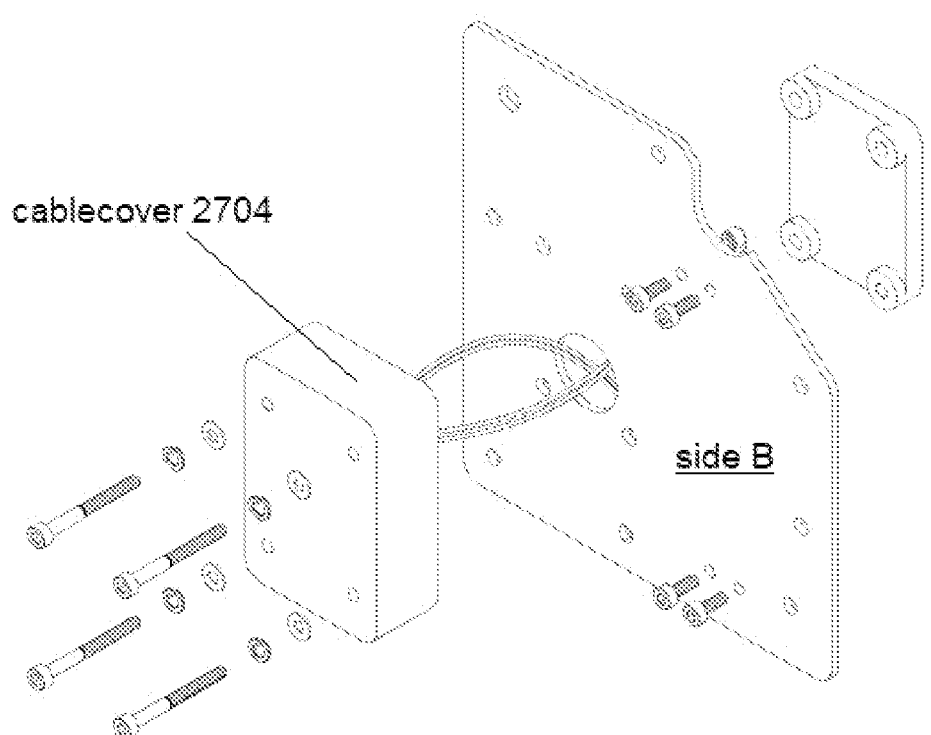
Figure 26:
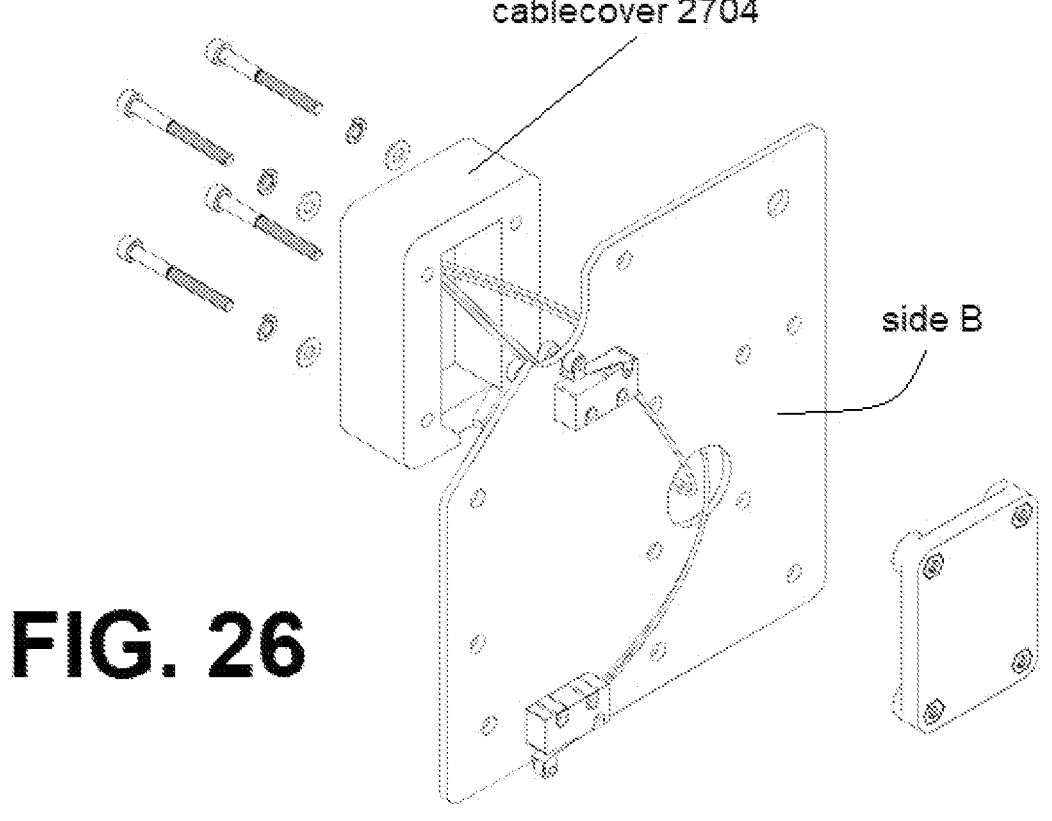
Figures 27A, 27B, 27C:
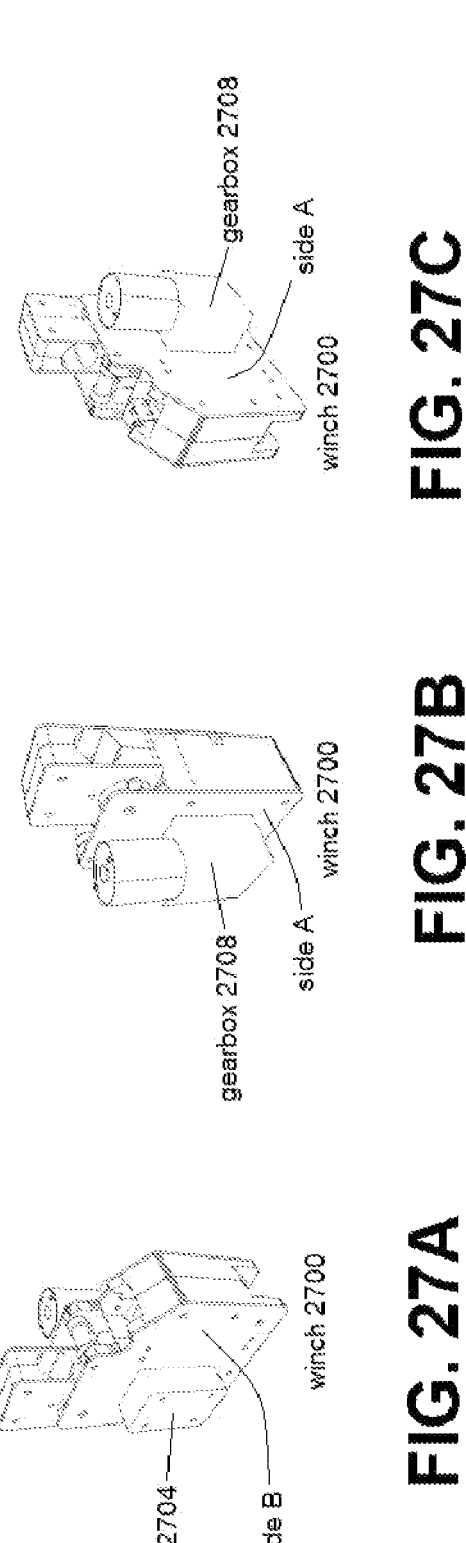

FIG. 9A-9B-9C show use of a sleeve-style drilling template;

FIGS. 10A-10B show landing legs;

FIG. 11 shows a potential arrangement of arms, legs, and motors;

FIG. 12 shows a communication cube which connects to the center of a flight controller (FC);

FIGS. 13-14 shows mounting the FC to a top plate;

FIG. 15 shows positioning an RFD modem;

FIG. 16 shows installing a right side battery rail;

FIGS. 17A-17B-17C show an exemplary sensor hub;

FIG. 18 shows a\the GPS unit;

FIG. 19 shows how the top and middle plates are mounted;

FIG. 20 shows some details of the detector;

FIGS. 21-22 shows details of a\the winch mount;

FIG. 23 shows an end cap;

FIG. 24 shows a winch spool;

FIGS. 25-26 show the winch body and one of its carbon fiber plates;

FIGS. 27A-27B-27C show an example winch, mainly its body; and

FIG. 28 shows a table with a general overview of recommended slicer settings used in fabricating the embodiments herein.

DETAILED DESCRIPTION OF THE PREFERRED EMBODIMENTS

Initial Context\Foundation

Figure 1A:
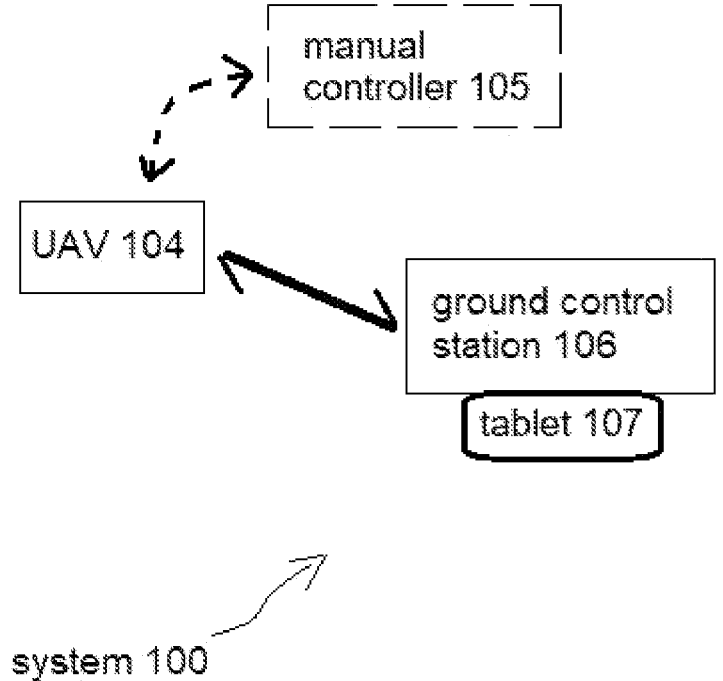
FIG. 1A shows an embodiment of a system.

FIG. 1A shows a system 100 comprising an unmanned aerial vehicle (UAV) 104, a manual controller 105, and a ground control station 106. The manual controller 105 is shown in dashed-line, because it is seldom used. For the most part, the system 100 runs entirely in a preprogrammed, autonomous mode, and typically does not need hands-on human guidance. However, there are exceptions, and the manual controller 105 is sometimes necessary. The ground control station 106 is operated mainly via a tablet 107.

The GCS 106 is used to communicate with the UAV 104, plan missions, and monitor missions while operating. The GCS 106 is better described as the back-end that allows the system to work. It controls the whole drone operation, data processing, flight monitoring, mission planning, and controlling, and so on. All the user interaction happens through the tablet. The GCS 106 uses a tripod to extend an antenna box with GPS and RFD capability. These components connect to a computer through USB. The computer then connects to the tablet 107 that is used as a user interface to setup, start, and stop missions.

Figure 1B:
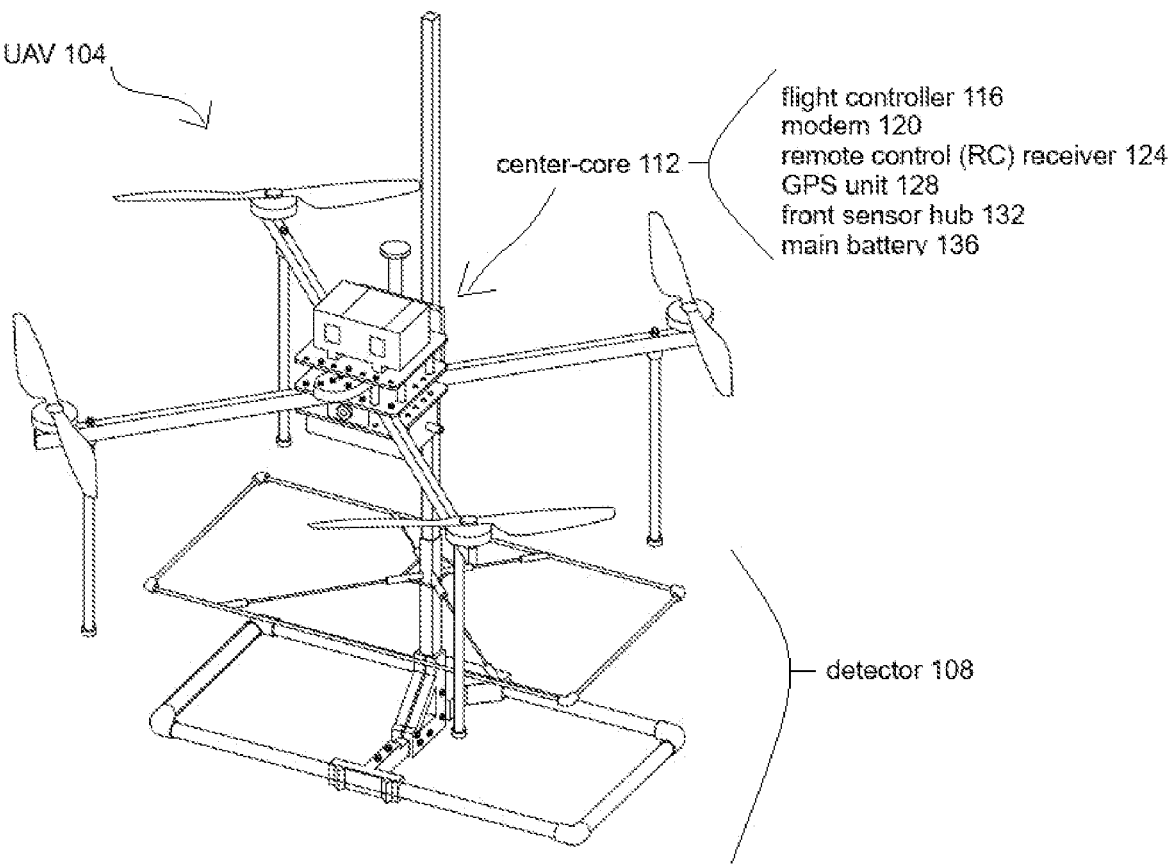
FIG. 1B shows an overview of a UAV that is part of the system of FIG. 1A.

The UAV 104 will take up the vast majority of this disclosure, of which an overview-only is shown in FIG. 1B. The UAV 104 comprises a metal detector 108, and a center-core 112. Within the center-core 112 are a flight controller (FC) 116, an RFD modem 120, a remote control (RC) receiver 124, a GPS unit 128 (GPS is mentioned for convenient short references, but this unit 128 also accommodates GNSS, and RTK), a front sensor hub 132, and a main battery 136.

One possible non-limiting way of operating the system 100 is as follows. A UXO-detection mission is planned using a drone control app (not shown) located on the tablet 107. The UAV 104 then flies that planned mission while precisely following the ground-contour and simultaneously flagging UXO/IED/EROW information, as shown in FIG. 1C. After that mission is completed, the UAV 104 flies back to a predetermined (but changeable) "home" location and lands (verb) onto the ground. At that time, a human operator can either start a new mission, or continue an existing mission by changing out the battery packs and proceeding from where the mission left off.

Once a mission is completed, the data is automatically transferred to a storage device (USB Drive, SD card, etc) attached to the GCS 106. The UAV 104 autonomously executes a flight plan while storing data collected by the detector 108, which can then be processed by a geophysicist. This collected data can also be processed directly on the GCS 106.

An important semantic occurs with respect to the flight controller (FC) 116, which will be referred to hereinafter as FC 116. A casual, consumer user of drone devices and consumer UAV devices may equate the FC 116 with the manual, human-operated hands-on controller that comes with a consumer drone, as suggested by the manual controller 105 shown in FIG. 1A. However, this would be mistaken.

It's important to be aware that the FC 116 referred to herein is not equivalent to any manual "controller". Instead, the FC 116 herein is a combination of electronic and mechanical components that plays a part in the entirely non-human and thus autonomous operation of the UAV 104. Further, other than during assembly described herein, no human ever touches the FC 116. Most of the special autonomous and metal detecting functionality actually comes from the GCS 106 and is not part of the FC 116.

This facilitates adding functionality to the UAV 104 while using fairly simple electronics and software on the FC 116. Thus the system 100 can easily be adapted to different drones.

Further, an embodiment of the UAV 104 exists in which some non-metallic or minimal-metal components may also be detected or flagged by the UAV 104, potentially using shape information obtained by a camera. In that embodiment, the system 100 surveys a location to detect metal targets, with particular emphasis on UXO/IED/EROW (UXO=unexploded ordnance, IED=improvised explosive device, EROW=explosive remnants of war), but also with at least some ability to suggest certain of the metal targets may be benign, e.g. old Pepsi cans (see FIG. 1C).

The effective depth of the metal detector 108 is up to 3 m, varying mostly via size of a target object size. A particular ground structure is almost irrelevant, and the metal detector 108 is agnostic (indifferent) to water and mud.

The system 100 utilizes an autonomous UAV incorporating a custom time-domain metal detector, and is fully compatible with standard tools for UXO and mine detection. For the system 100 to work effectively, maintaining a stable distance of UAV 104 from ground is crucial. This feature leads to increased accuracy of the detector 108. The system 100 is capable of precisely following real world terrain at distances as close as 20 cm, and is able to avoid obstacles in its flight path.

The system 100 cuts down UXO-survey times to a fraction of time needed for conventional survey methods currently being used for UXO and mine detection. Further, the system 100 achieves this while improving accuracy, safety and cost effectiveness.

Finish Initial Context, Begin Main Disclosure

The manufacturing and assembly of the UAV 104 will form the rest of this disclosure. These steps and techniques will require certain types of skills, comprising: soldering 3D printing, CNC machining, ability to set up microcode used to custom-configure a flight controller and various circuit boards, and use of numerous shop tools.

Assembly of the following components is recited herein, but not necessarily in this order. Numerous other components are also discussed, but the below is a decent beginning summary:

| | |
|---|---|
| arms 204 | center core 112 |
| flight controller FC 116 | GPS unit 128 |
| RFD modem | RC receiver 124 |
| winch | metal detector 108 |

This portion of the disclosure recites various assembly processes to build out a system 100, and specifies various components needed to make the UAV 104, including detail on 3D printed parts, CNC machined plates, and fastener specifications, among other items. In achieving the above, a considerably amount of 3D printing and fabrication, including CNC fabrication, will be necessary. These are discussed in the APPENDIX B at the end of this disclosure.

While the steps and processes described herein are laid out in a particular order that has been found to be effective, the order of this disclosure is but one potential way of building the embodiments herein, and thus should not be considered as limiting.

Figure 2A:
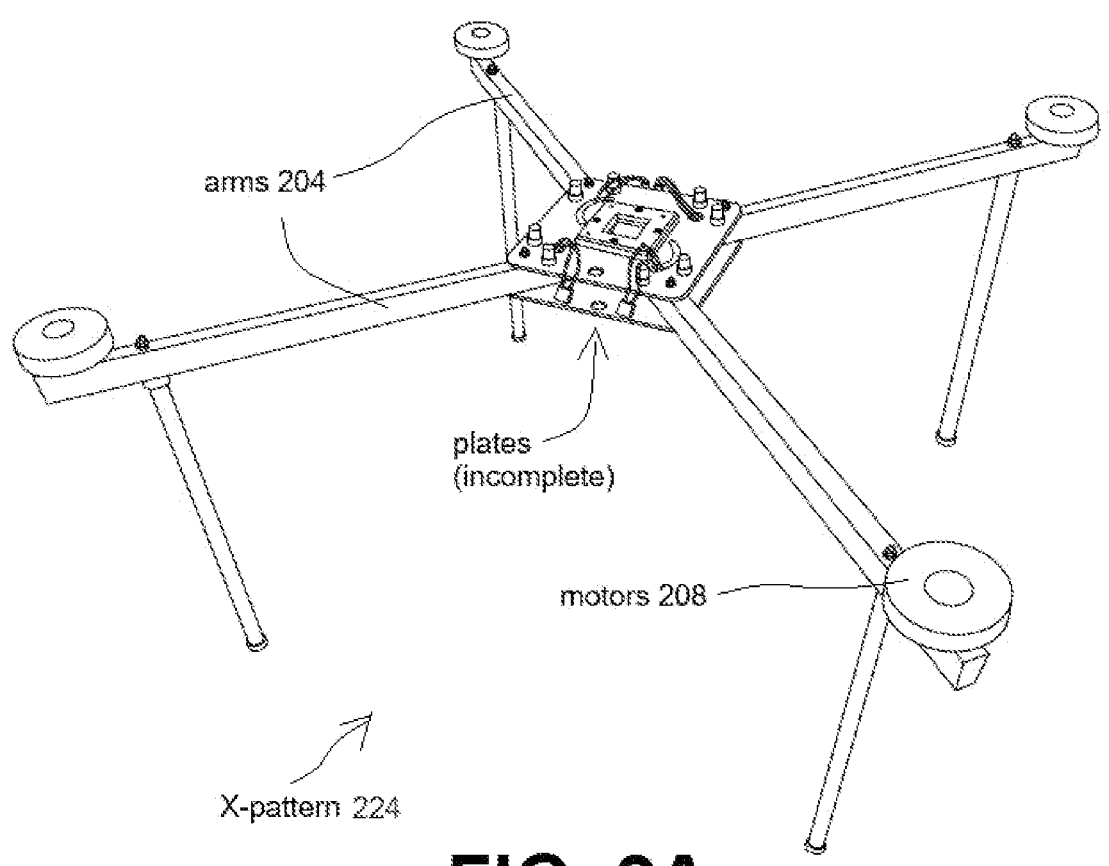
FIG. 2A shows an implementation of a frame within the UAV.

FIG. 2A shows the various arms 204 of the UAV 104, which in an embodiment comprise painted aluminum tubing having predetermined dimensions. As shown at least within FIGS. 1B and 2, a frame of the UAV 104 is built in an X-pattern 224 with a motor 208 at the end of each arm 204. In the center of the X-pattern 224, three plates are used to mount the arms together and hold the electronics.

A longer side of an arm 204 will be perpendicular to the underside of the UAV 104. A potential first step in building the UAW 104 is preparing the arms 204 for assembly. The arms 204 each comprise an aluminum tube that holds the motor 208, an electronic speed control (ESC) 220, and landing leg 1000 on the end of each arm 204. Each arm will connect to the center-core where they will connect to a power distribution board (PDB) 212 and flight controller (FC) 216.

As shown at least within FIG. 2A, the arms 204 extend from the center-core 112, one on each corner, to form a X-shape 224. Each arm 204 holds a motor 208, an ESC 220, and various wiring.

Figure 2B:
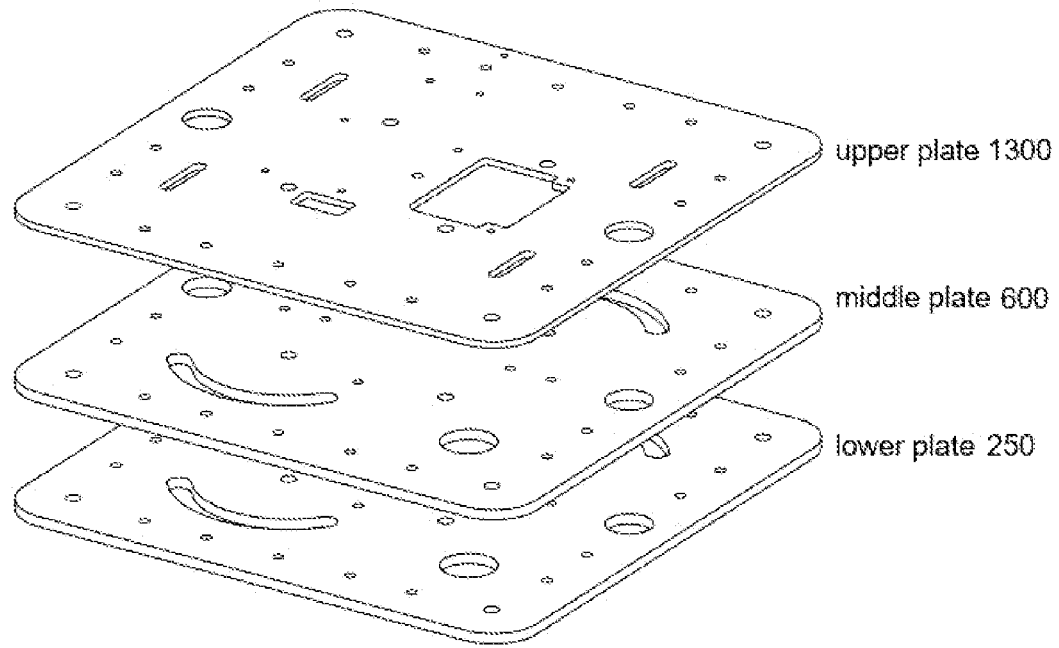
FIG. 2B shows an arrangement of plates within a center-core.

FIG. 2B shows an arrangement of plates within the center-core 112: upper plate 1300, middle plate 600, and lower plate 250.

During manufacture of the arms 204, the aluminum tubing is cut to a predetermined size. In an embodiment, the aluminum tubing may have (but is not limited to) predetermined dimensions e.g. 20 mm×40 mm×2 mm, cut to e.g. 70 cm length. However, these measurements are non-limiting, and the embodiments herein should not be considered as limited exclusively thereto.

During manufacture, use the one or more templates to mark the locations of holes in the arm 204. One template will be used on the motor end of an arm 204, and the other is used for the center-core side of the arm 204. The templates have a flat edge that needs to be flush with the end of the aluminum tube so that the holes line up accordingly.

In manufacturing the arms 204, there can be two drilling template files; one for each end of the arm 204. A drill press is recommended to ensure the holes are concentric and straight.

After the holes are marked, secure the arm to the drill press and drill the holes labeled on the template. Some holes will be through holes while other holes will only be drilled through one wall of an arm 204 and thus not entirely through. After fabrication, deburr all sharp edges to ensure no damage to later wiring that will be located therein.

After the arms 204 are fabricated, they are painted with matte black paint. This paint covers/protects the aluminum and gives the UAV 104 a clean look. Painting is only done after the various arms 204 are cut and drilled. A potential, non-limiting paint color could be matte black. Clean the bare aluminum arms 204 with alcohol or other cleaning solvent to clean off any dirt or cutting oils.

It may be helpful to use a 3D printed stand to help keep the arm upright while painting. Apply multiple even coats, where a first coat should be very light. Then, let the arms 204 dry in a clean location to avoid dust sticking to wet paint. After painting, use caution when assembling the following steps, as the paint could get scratched or chipped. Covering the painted arms 204 in some thin foam will protect them during assembly.

At this point in an assembly process, it is necessary to arrange a motor 208, an electronic speed control (hereinafter ESC 220), and various wiring to be inserted into the aluminum tube 404 thus forming an arm 204. These steps will need to be done 4 times in order to build the four arms 204. The only variable will be the crossing of the motor wires that will tell the motor 208 which way to spin. An example spinning arrangement in shown in FIG. 3.

Figure 3:
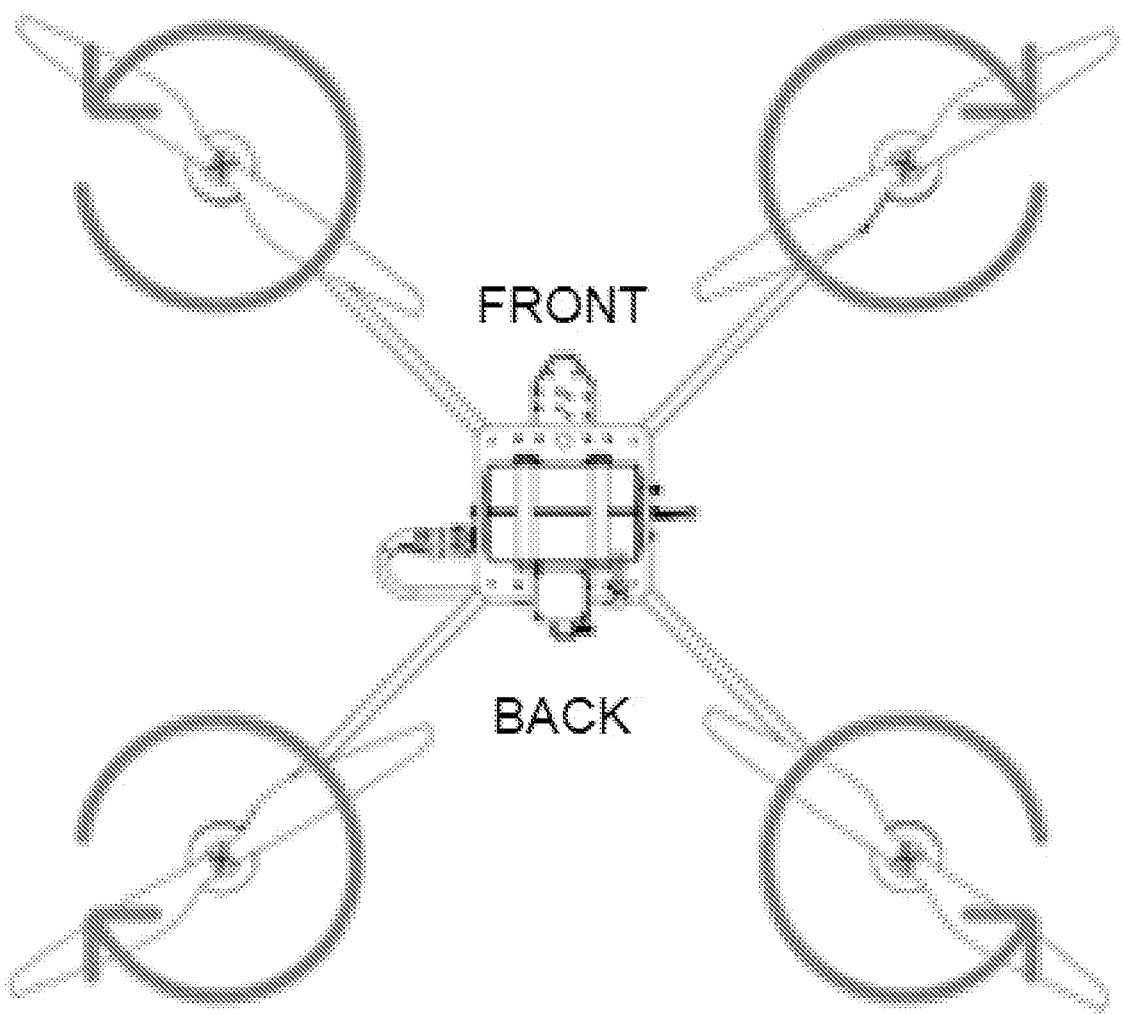
FIG. 3 shows an example spinning arrangement.

First, a case for the ESC 220 is modified with a 3D printed part having specialized features so that the ESC 220 can be inserted into the arms 204. During assembly, make certain of connecting the 3 motor wires to the side of the ESC 220 with 3 orange wires. In an embodiment, various clockwise spinning motors have 2 wires that connect from motor 208 to the ESC 220 swapped, meaning that wire 1 on motor connects to wire 2 of the ESC 220, and wire 2 on the motor connects to wire 1 on the ESC 220. Meanwhile, counter-clockwise motors have all 3 wires connected in line. As shown in FIG. 3, the completed UAV will have 2 motors spinning clockwise and 2 motors spinning counter-clockwise. Always apply the heatshrink over the wire before soldering. After soldering is too late to remember the heatshrink.

Once having finished wiring the motor 208 to the ESC 220, now wire the other side of the ESC 220. Some remaining spare connectors within the arm 204 are used for special user customizations and feature additions.

The wiring for the various arms 204 should now be complete. FIGS. 4A-4B shows how to assemble these components into an aluminum tube 404. FIGS. 4A-4B are helpful because the two views are actually the same item. The rear view is completely assembled and covered, while the front view is shown in "exploded" format because the assembly and details are so complex. Indeed, this disclosure makes use of "exploded" format at numerous locations, because 1) such an image is super-clarifying, and 2) trying to convey this in ordinary format and ordinary prose-description is so difficult.

The arm tubes 404 each have 2 different sides. One side has holes toward the end of the arm 204 and a hole on the inside, which is the motor mounting end. The other side has two holes with a hole between them, this end mounts to the center-core with wiring coming up through the larger hole.

It is helpful to use caution when handling the arms 204. The paint can be scratched easily, so protect the painted surface with some foam or clean towel while assembling the next few sections. Start by feeding in the red, black, and servo wires through the motor mount end of the arm tube 404. The ESC 220 is then slid into the arm tube 404 and should sit about ⅓ of the way down. One must be careful with the motors 208 at this step, as they are not yet attached to any arm 204, and should just sit on a surface of a table while working through the next few steps in the assembly process.

Once wires are coming out of the other end of the arm tube 404, feed these power wires and servo connection through the single hole between the two smaller holes. The servo connection that was covered with heatshrink will stay inside the arm 204.

During manufacture, insert an end cap into a center-core end of the arm 204. Ensure the cables inside are routed correctly and not pinched or blocking the arm mounting holes. Heatshrink should be placed where the wires come out on the center core end of the arm 204 to protect the wires from the drilled metal hole. It is important to be careful with these wires and take extra caution not to squeeze or damage any of the wires.

At this stage of assembly, the motor mounts can be attached to the motor end of the arm. Attaching the motor mounts involves ensuring these mounts are all tilted inward towards an axis between the front and back of the UAV 104. FIG. 4A illustrates this principle. First, the MotorMount parts need to be assembled and attached to the arm 204. Insert the two bolts 400C from the top down through the two holes in the carbon fiber plate D, then through the top motor mount 400F, through the arm and endcap 400G, through the underarm-plate 400H, and lastly held on by washer 400I (not shown in FIG. 4), lock washer 400J, and lock nut 400K.

During assembly, ensure the tiltplate 400B is correctly positioned with the bolts aligned inside therein, and also assembled in a correct orientation. The motor 208 is then attached to the mount 400F using the bolts 400E. Some type of adhesive is required for each of these bolts to ensure they do not back out during operation. Tighten each of these bolts a little bit at a time to make sure the motor gets mounted securely against the tiltplate 400B. After assembly of the motor mount and motor 208, check that all bolts are all torqued down tightly and ready for flight.

Grounding Issues

Figure 5:
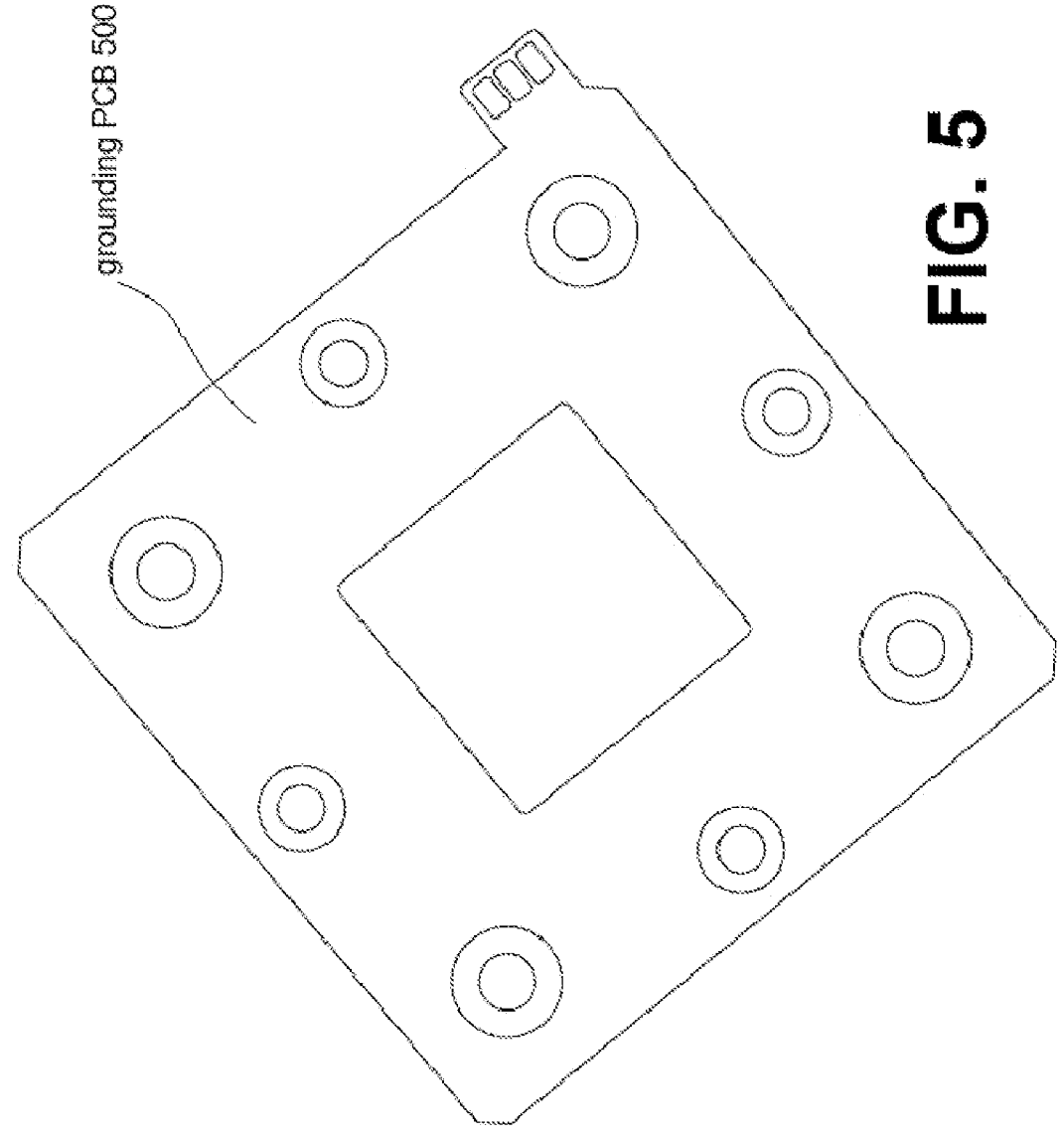
FIG. 5 shows a grounding Printed Circuit Board (gPCB)

This entire disclosure will repeatedly refer to various proprietary grounding strategies, of which the following is just one. It is important that all parts of the UAV 104 are properly grounded in order to prevent Electro-Static Discharge (hereinafter, ESD) built up in surrounding air, which could adversely affect readings of the detector 108. Accordingly, FIG. 5 shows a grounding Printed Circuit Board (hereinafter gPCB) 500. The gPCB 500 is sandwiched between the nut holder and the bottom plate 250 and allows the components of the UAV 104 to be grounded. Additionally, the ground connections of various servo connectors are also used.

During assembly, use a multimeter to insure low resistance between propeller mount screw hole on a rotating motor bell to a bare metal surface located inside the mounting holes of an arm 204. Resistance should be lower than 200 ohms.

For further grounding, a servo cable can be easily repurposed by removing the pins other than ground and connecting it to one of the servo pin headers for the arms, with the other end soldered to one of the gPCB's grounding pads. Coming out of the grounding gPCB 500, a singular female pin connector can be used to connect to a grounding line going to the detector coil when installed.

Figure 6:
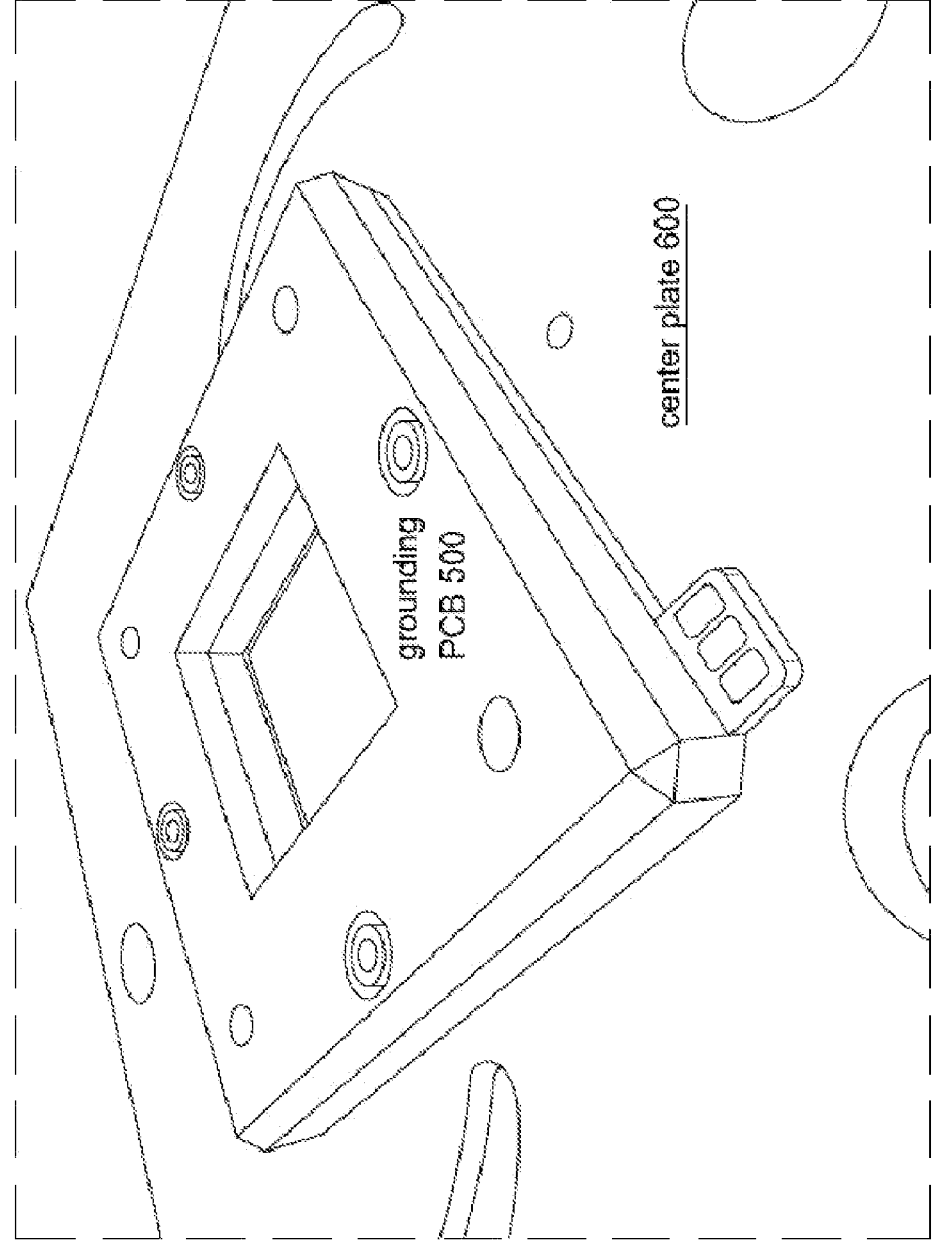
FIG. 6 shows the gPCB of FIG. 5 attached to a middle plate.

After assembling all of the arms 204, attach them to the center-core 112 using the following steps. As shown in FIG. 6, first set up the middle plate 600. The grounding PCB 500 will need to be installed between the nut holder and the middle plate 600. This middle plate 600 provides grounding to all the parts mounted thereto as well as a few other points to connect grounding wires from the metal detector 108. The gPCB 500 should be oriented so that the extra grounding connections are facing towards the back of the UAV 104.

Each arm 204 of the UAV 104 is mounted between the bottom 250 and middle 600 plates of the center-core 112 through two screws, thereby forming the X-pattern 224 shown in FIG. 2A.

The first two arms 204 are mounted across from each other with wing nuts on the outward mounting hole. The other two arms 204 are mounted using hex nuts. The wing nuts are used so that the UAV 104 can easily fold up into a transport case (not shown).

Between each arm 204 and the center plate 600 is a 3D printed spacer. In an embodiment, the center plate 600 can be made from carbon fiber (CF). The top spacer contains an opening for the wires coming out of the arm 204 while the bottom spacer is mostly solid and does not provide any openings.

Mount all arms 204 by installing them in the correct location/orientation, running the bolt through the two inner holes of the arm 204. The middle plate 600 is then installed on top with a wing nut or hex nut, depending on the location.

Figure 7:
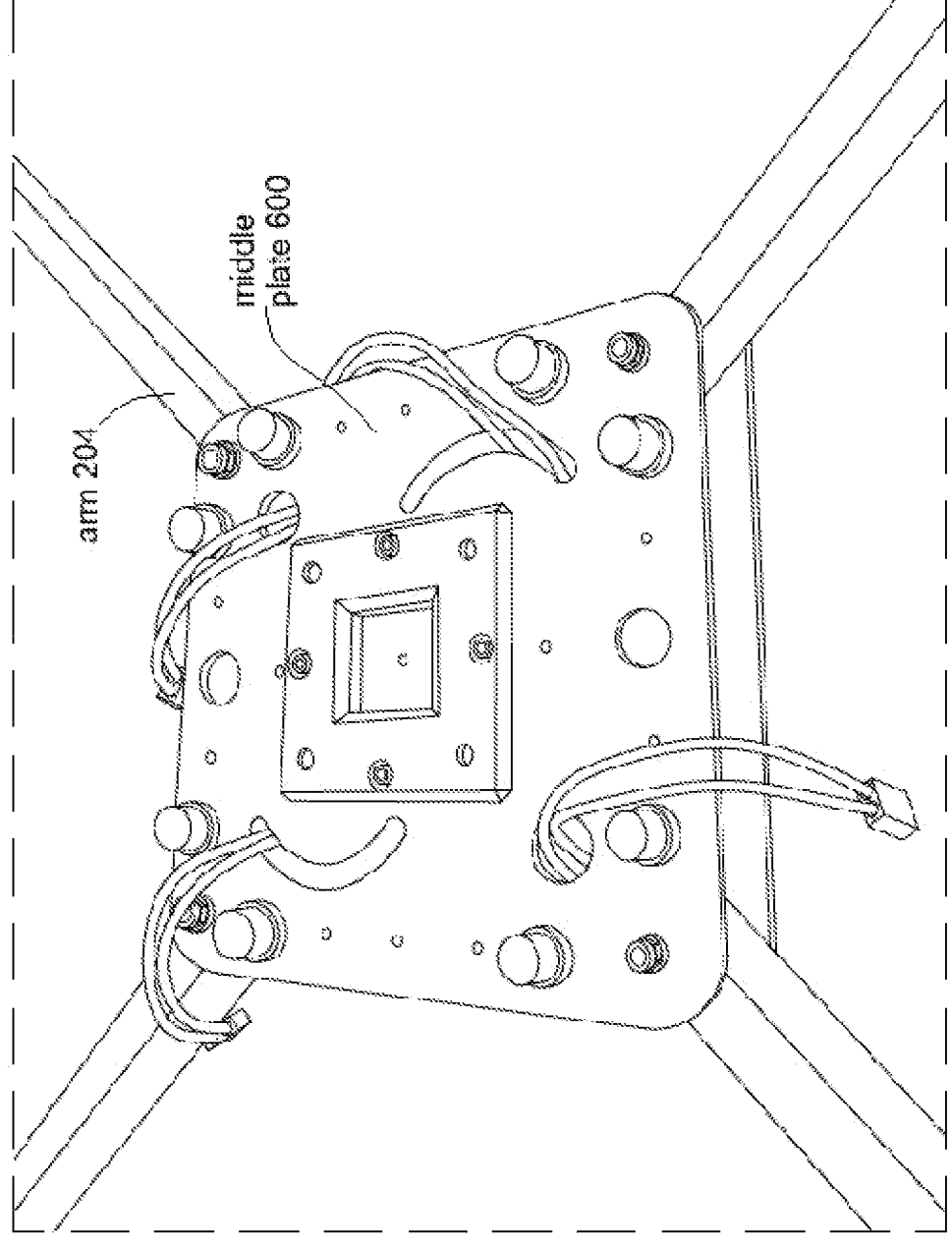
FIG. 7 shows a route for guiding various wiring through curved slots on the middle plate.
Figure 8:
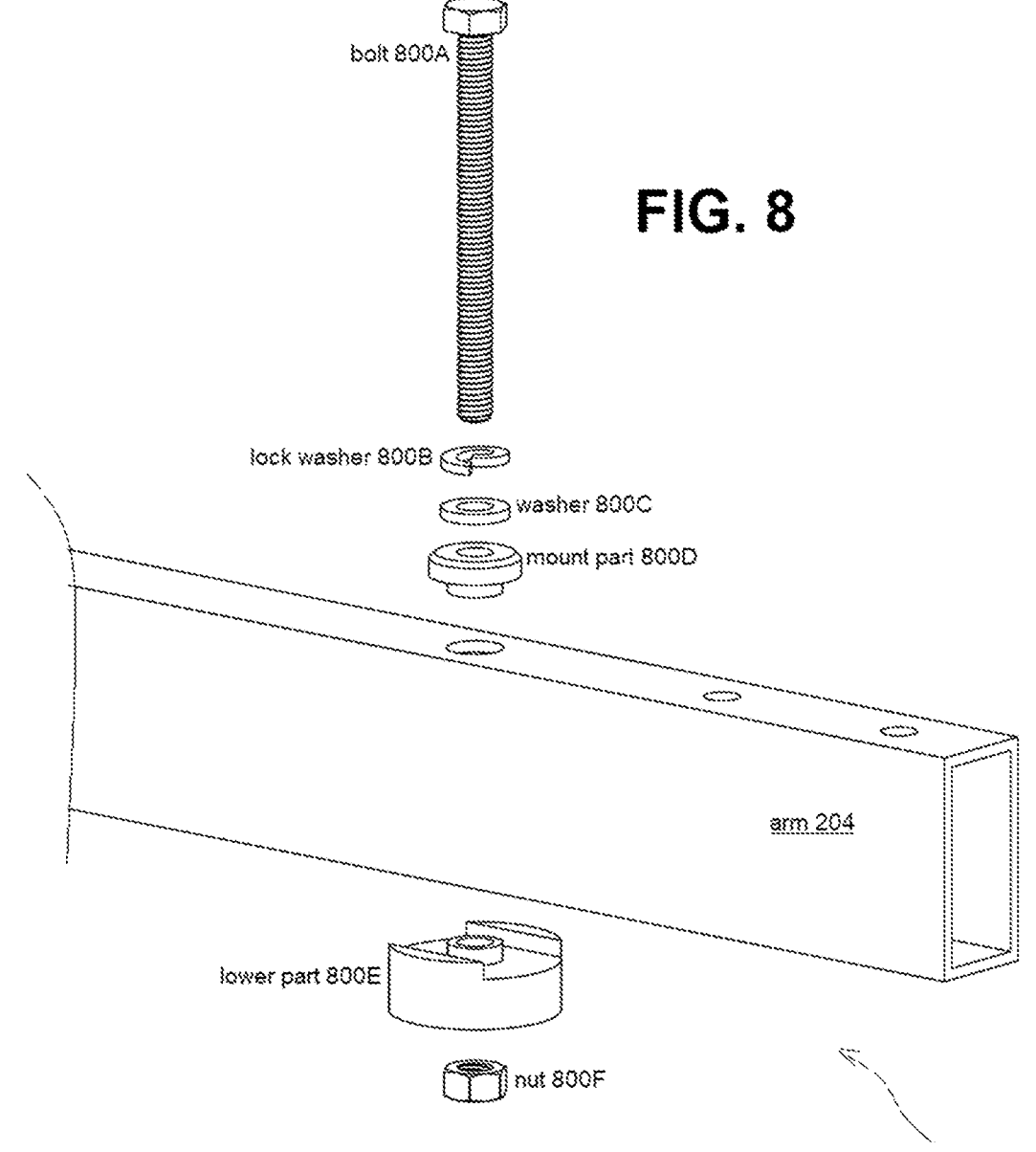
FIG. 8 shows a partial view of a leg mount.

As shown in FIG. 7, the various connections coming from the hole in the top of the arm 204 need to be guided through the curved slots on the middle plate 600. FIG. 8 shows a partial view of a leg mount 800. To assemble a leg mount 800, insert a bolt 800A with a lock washer 800B, washer 800C, and 3D printed mount part 800D into the hole from the top through the arm 204 and through the 3D printed lower part 800E which needs a nut 800F inserted into the hex hole. Tighten this bolt down snugly until the lower part 800E fits along the edge of the arm securely. Once the leg mounts 800 are installed, the various legs 1000 can be screwed on and off easily.

The landing legs 1000 are configured to hold the UAV 104 off the ground thereby allowing the metal detector 108 to be mounted on the underside of the UAV 104. As shown in FIGS. 10A-10B, these landing legs 1000 can comprise a carbon fiber tube, a bottom cap which acts as a pad on the ground, and a top cap 1008 that mounts to the arm 204.

When constructing a new landing leg 1000, it is necessary to correctly drill a hole in the carbon fiber tube so that the top end cap 1040 can be secured to the remainder of the body of the landing leg 1000. To do this, use a 3D printed sleeve drilling template 904 as shown in FIGS. 9A-9C. Push the carbon fiber tube all the way into the guide, then drill a hole all the way through. A drill press is recommended to ensure the hole is straight.

FIG. 9A is a first image shows the leg 1000 next to the drill sleeve template 904. FIG. 9B shows how an upper portion 912 of the leg 1000 fits into the sleeve 904. FIG. 9C shows the final result after using the sleeve to drill a hole 908 in the upper portion 912.

As shown in FIG. 10A, each leg 1000 has a hex nut 1020 embedded into the mount for easy installation and removal. FIG. 10A is a cut-away view of portions of the leg 1000, while FIG. 10B is a fully-enclosed view of the same.

First, assemble the top cap into the end of the leg 1000 with the drilled hole. Before inserting, push a nut 1020 into the hex slot and temporarily secure it with a bolt so the nut does not fall out during assembly. When pushing the insert in, ensure that the drilled hole lines up with the hole through the insert. Slide a sleeve 1012 on between the top cap 1008 and drilled hole before installing a bolt 1004, washer 1016, washer 1024, lockwasher 1028, and locknut 1032 to secure the top of the landing leg 1000. The bottom cap can now be installed and should press all the way in by hand.

Repeat the steps for building the arms 204 and legs 1000 until a quantity of 4 is reached, as shown in FIG. 11. To re-cap from earlier, the motors 208 on two of the arms 204 will need to be clockwise spinning rotation, and the other two motors 208 will need to be counter-clockwise spinning rotation with respect to FIG. 3. All other steps will be mostly identical, except that a tilt plate orientation depends on the spinning direction of the motor 220 on each arm 204.

The legs 1000 can be easily replaced if damaged. Extras will be provided at sale each system 100, e.g. in spare parts kit packaged with every copy of the system 100 that is manufactured. The UAV 104 operates in rough environments where there is no time or means for delicate handling and TLC. Thus, the UAV 104 is arranged such that each leg 1000 can be quickly and easily unscrewed, repaired or reassembled, then screwed back onto the arm 204.

As stated earlier, the middle section of the UAV 104 is the center-core 112. As shown at least within FIG. 1B, the center-core 112 contains the FC 116, the RFD modem 120, the remote control (RC) receiver 124, the GPS unit 128, the front sensor hub 132, and the main battery 136 are all located in the center-core 112. The following will now focus on building the electronics and assembling the various plates e.g. upper plate 1300, middle plate 600, and lower (bottom) plate 250.

As shown in FIG. 12, the comm-cube 1200 connects to the center of the FC 116, on a carrier board 1204. The carrier board 1204 is carefully designed to do effective power distribution, yet retain effecting grounding pads. To that end, the carrier board 1204 has markings that show which orientation the comm-cube 1200 should face. The comm-cube 1200 is a type of brain of the FC 116, including numerous sensors as well as a microcontroller that runs specialized-computer-implementation which drive and help operate the UAV 104.

After all connections have been soldered to the carrier board 1204, the FC 116 is assembled to the underside of the top plate 1300. Orient the FC 116 so that it can be mounted to the top plate 1300. Also, the communication-cube 1200 should be facing the top plate 1300 and the connections for the FC 116 should be visible through the window in the top plate 1300. There will also be a specialized cover (not shown) located between top-plate and for the FC 116 to make it rainproof.

FIGS. 13-14 shows mounting the FC 116 to the top plate 1300 using standoffs. During assembly, four standoffs are used on each corner, and one on a middle location. For clarity, only the middle arrangement is shown in FIGS. 13-14. The standoffs space the FC 116 off of the top plate 1300. As shown in FIG. 14, during manufacture, fasten the standoff to the top plate 1300 using a lock washer 1408B and washer 1412C between a bolt 1404A. At the bottom of the spacer/standoff 1416D is the FC 116 followed by another washer 1412C, lock washer 1408B and a bolt 1404A.

A customized set of parts encase the RFD modem 120. FIG. 15 shows how to position the RFD modem 120 to function properly. Specifically, the RFD modem 120 is mounted to the bottom of the top plate 1300 with a heat sink facing down, away from the top plate 1300, and the antenna connections 1504 facing out. Mounting holes are located on the left side of the top plate 1300. Plug a connector and wiring into the RFD modem 120.

The RC receiver 124 (RC==Remote Control) is used to manually fly the UAV 104 on rare occasions. The RC receiver 124 is mounted within a customized fitted case that is then mounted to an RH side of the top plate 1300. A hole on the side of the case should align with the pairing button on the receiver.

FIG. 16 shows installing a right side battery rail 1604. Conveniently, the fasteners used for the RC receiver 124 are also used to hold this rail 1604 to the top plate 1300. The case is mounted to the top plate 1300 using two bolts with a longer one being used on a thicker side of the case.

An antenna from the RC receiver 124 will eventually be routed through a small hole in the back of the case. Then, that antenna is fed through another hole next to where its exit is routed back to the other side of the case. A small amount of hot glue can be used to affix the RC receiver 124 inside, but if so, it's important to apply the glue inside the case before pushing the RC receiver 124 to be fully inside the case.

The batteries are installed between four battery rails that are assembled to the upper plate 1300. These rails hold the battery in place during flight of the UAV 104. In the last step, the right side battery rail was installed with the RC receiver 124.

Accordingly, now install a left side rail using two bolts, washers, lock washer, and lock nuts. Next, install the inner battery rails using four bolts, washers, lock washer, and lock nuts. The right side inner rail covers an access hole that will need to be accessed later when wiring the FC 116. It is best to leave one of the bolts unassembled until wiring is complete. After wiring is complete, the bolt will need to be installed to mount the inner battery rail.

An example sensor hub 132 is shown in FIGS. 17A-C, and contains mounting locations for the rangefinder as well as other locations to mount other cameras and sensors. The sensor hub 132 is designed to mount on the front of the UAV 104 at an angle so that it can "see" ahead of the UAV 104 and adjust its altitude according to terrain. The assembly consists of the case 1708, lid, and tiltplate 1732 (FIG. 17C) to angle the case.

First the rangefinder and other electronics e.g. a camera equipped with e.g. shape-recognition software such as e.g. UXOWIEDEROW shapes need to be assembled into the sensor hub 132. It is understood that the desired UXO shapes change constantly as warfare changes. Accordingly, the system 100 works from a preconfigured shape-library which is continually updated over time. The rangefinder 1704 fits within the case 1708 with a channel 1712 for various cables 1716 to pass through.

FIG. 17C shows how the sensor hub 132 is mounted to the front of the UAV 104. The sensor hub 132 uses the tilt plate 1732 for angling it so that the rangefinder always looks a bit ahead of the UAV 104. As shown in FIG. 17C, the sensor hub 132 is mounted to the underside of the top plate 1300, on the front of the UAV 104.

FIG. 18 shows the GPS unit 128 (again, this includes GNSS, not just GPS) which is used to determine where the UAV 104 is located and inform the GCS 106. The GPS unit 128 communicates with multiple satellites to triangulate position. The GPS 128 is mounted to a 3D printed extension (riser) 1804 that puts it above the UAV 104, thereby avoiding electrical interference. Again, the expression "GPS unit" is just a label, for quick recognition only, and should not be considered limiting. Other non-GPS mechanisms can also be used.

The GPS unit 128 is mounted to the top of the riser 1804 that connects to the top of the UAV 104. As shown in FIG. 18, mount the GPS adapter plate on top of the stand using three bolts with spacer, washer, lock-washer, and locknuts. Run the cable through the riser 1804 from the top down and pass the cable through the circular cutout where the GPS stand mounts. The GPS unit 128 can then be mounted to the top plate 1300 using four bolts, spacers washers, lock washers, and locknuts.

After the GPS unit 128 is assembled to the riser 1804, this assembly can be mounted to the top plate 1300 of the UAV 104, using pre-machined holes. Use two bolts, washers, lock washers, and wingnuts to fasten the GPS unit 128 (including riser\tower 1804) to the top plate 1300. Wing nuts are used to easily collapse the GPS assembly tower for transportation. If collapsing is not needed, the GPS riser\tower 1804 can be installed with lock nuts instead.

The batteries are held to the top 1300 using e.g. two straps. These are then buckled down tightly to hold the batteries in place. The top plate 1300 will have the two battery straps extend through dedicated slots machined therein. Starting from a rear slot, feed the strap from the top down through that slot, then back out through a front slot. The buckle should be closer to the rear, facing up so that the clamp can close (verb) when a battery is installed. During manufacture, make sure this strap runs above any cables on the underside of the top plate.

FIG. 19 shows how the top 1300 and middle 600 plates are mounted using e.g. eight rubber dampeners with a short spacer on the bottom, and a long spacer on the top. The rubber dampeners are used to isolate any vibrations from the UAV motors to the FC 116.

During assembly, start with the middle plate 600 by taking the bolt 1904, add a lock washer 1908, put this bolt up through the middle plate and then add the bottom spacer 1912 to the bolt after the plate. Then screw in the dampener into the bolt after the spacer 1912. Do this for all eight dampener and spacer sets (only one of which is shown in FIG. 19).

Line up the long spacers 1916 on top of the dampener. Once all the spacers are set, align the top plate 1300 by its holes. Bolt the top plate 1300 into place by using a bolt 1920, with lock washer 1908 nearest the head of the bolt 1920, and washer 1924 that will touch the plate 1300. Screw in these bolts to the holes that are aligned with the long spacers 1916.

Two separate DC/DC converters are utilized within the UAV 104, both mounted to the front of the UAV 104 on the bottom plate 250. These are 24V DC/DC and a 12V DC/DC converters. Each is attached with a 3D printed plate with inset nuts to mount flush with the plate 240. The bottom plate 250 with the winch mount 2104 must be assembled first in order for the DC/DC converters to be mounted, because two of the mounting screws go all the way through the rod center mount.

The 24V DC/DC converter is mounted to the UAV 104. Two lock nuts and lock washers need to be pressed into the hex-shaped holes on the 24V DC/DC converter mount. The mount then needs to be assembled to the bottom plate 250.

The 12V DC/DC converter is mounted to the UAV 104 by bolting to a mount at the front of the bottom plate 250. This mount will sit beside the other DC/DC converter adapter. Two lock nuts and lock washers need to be pressed into the hex-shaped holes on top of the 12V DC/DC converter mount.

The mount then needs to be assembled to the bottom plate 250. This step is very similar to the other DC/DC converter assembly. It is best to prepare the DC/DC converters before installing on the UAV 104. After preparing the converters, they can be mounted to the DC/DC converter mounts (DCM). The mounts are located under the bottom plate 250, at the front of the UAV 104.

After the DC/DC converters are installed, the 3-pin servo connection added will need to be wired to the FC 116. The arms 204 should now be connected to the FC 116.

A connector and 2 wire servo connector is routed through a slot in the middle plate 600. In an earlier step, connectors were soldered onto the FC 116 at each corner. Plug the connectors coming from the middle plate 600 into the corresponding connector on the FC 116. Each arm 204 should have this connector. Make sure the orientation of the servo connector is correct according to the markings on the FC 116. All four arms 204 are connected the same way.

The RFD modem 120 is connected through to the FC 116. A cable from the RFD modem 120 should run to the top of the FC 116. There is a cutout in the upper plate 1300 to access ports within the FC 116. A plurality of antennas come with the RFD modem 120, and should be oriented to always stand vertical and be parallel with each other.

At this stage of assembly, the GPS unit 128 can be connected to the FC 116.

Begin Winch 2700+Detector 108

FIG. 20 show some details of the detector 108. The coils control box 2012 controls the upper/lower coils 2004, 2008 and is mounted underneath the UAV 104. This location facilitates better electrical connections to the upper/lower coils 2004, 2008.

A mounting adapter for the coils control box 2012 will need to be installed first. The mounting adapter is mounted to the underside of the bottom plate 250 using already drilled holes. Fasten the mount using two screws with flat washer on both sides of the part and plate, with a lock washer and lock nut on the topside of the bottom plate 250. To mount the coils control box 2012, use two bolts extend through the two mounting holes through the box. These bolts will fasten down into embedded locknuts in the adapter installed earlier.

The detector 108 utilizes time domain metal detection (including non-ferromagnetic items). To achieve this, it is necessary to have good signal quality. The detector 108 achieve noise reduction through a matching subtraction process, thereby compensating noise with multiple antenna coils 1004/1008.

The detector 108 is different from what was used in ground-based (cart) implementations. Such non-UAV ground-based detectors may be 2 or 3 times heavier than the detector 108. The detector 108 also has a different coil layout as the upper coil 2004 is not present on the conventional sensor. The upper coil 2004 was added because any particular UAV including the UAV 104 creates a lot of electromagnetic interference. A lot of that noise is removed by introducing the winch 2700 and moving the coils 1004\1008 away from the UAV 104.

Even more noise is reduced by placing a second (upper) receiver coil closer to the UAV 1004 and then subtracting the signal from the main (lower) receiver coil 1008. As the upper coil picks up mostly drone noise and the lower coil mostly the useful signal, this schema reduces noise a lot.

Power Considerations

The system 100 takes various steps to maximize power conversation, which lends to better detection-outcomes and spanning wider areas of land-mass. The winch 2700 uses no power when fully retracted or extended, it doesn't have a separate battery, and the power draw when winching is insignificant to what the drone motors consume. The power consumption of the sensor hub 132 is insignificant compared to the power consumption of a motor for the UAV 104.

FIGS. 27A-B-C show an example winch 2700, mainly its body-only, not yet installed within the system 100. The winch 2700 was developed so that the detector 108 can be retracted up to the center-core 112, or extended away from the UAV 104 during operation. The winch 2700 can also be attached and detached at will to allow easier transport. The winch 2700 consists of a mount on the center-core 112, the body of the winch 2700 which holds the motors, a paracord line 2408, and the electronics. The winch 2700 is eventually attached to the detector 108.

The winch 2700 is controlled by the GCS 106. The winch 2700 has a controller therein pre-configured with various features such as receiving winch-control commands "full up", "full down", "stop", and other commends. The controller then controls a winch motor accordingly, including reading some end switches.

The GCS 106 also directs the winch 2700 to extend or retract, depending on what task the UAV 104 is doing. For example when doing a normal survey mission, the UAV 104 takes off from ground, first extends the detector 108, then does a calibration, and only then goes to the mission area. Then UAV 104 then conducts the surveys the area until the battery runs out, or the survey is finished, retracts the detector 108, and comes back to land. The entire process starts over according to the user and the GCS 106, such as but not limited to when the battery is swapped, a new mission is planned, repairs, or other of many possibilities.

When the system 100 and detector 108 is operating (e.g. at its planned destination\route), the two coils 1004/1008 are always separated at a fixed specific distance. When the system 100 and detector 108 is in motion but not operating, or in storage, the two coils 1004/1008 are always together when retracted.

As shown at least within FIG. 20, the detector 108 consists of a smaller upper coil 2004 and a bigger lower coil 2008, with a fixed distance in between when detecting. All hardware around the detector coils 2004\2008 are assembled using plastic or nylon screws to increase reading accuracy.

The bottom coil 2008 is made up of the large coil and a brace that attaches the coil to the winch 2700. The back edge of the winch mount 2104 is centered on a coil support brace. During installation, while the brace is in-location, mark the locations of the 3 screw holes. Use the vertical holes in the brace to mark the 3 hole locations in the fiberglass square tubing that connects the coil 2008. Insert the fiberglass square tube into the bottom mount. While sitting in the winch mount 2104, mark the mounting holes on the tube, then drill each mark with a drill bit.

The winch mount 2104 is then assembled using nylon bolts, with nylon washers and nuts. In a later step, the paracord 2408 is fastened around a top nylon bolt in a later step.

The paracord 2408 can also be known as a "bottom rope". A top rope (not explicitly shown herein) acts to keep the top coil 2004 at a fixed distance when extended. Meanwhile, the bottom rope (paracord 2408) is extended or retracted by the winch 2700, and controls movement of the bottom coil 2008.

The bottom coil 2008 uses some small terminals connected to the grounding wires that run around one or more coil connections. These terminals will be fastened to the coils-connection box 2012. Some connectors are added for convenient disassembly if repair or adjustment is necessary.

The top coil 2004 is assembled using custom 3D printed parts that allow it to attach to the vertical fiberglass pole. From FIG. 20, it is apparent that the top coil 2004 is smaller than the bottom coil 2008 in diameter, but their footprints are the same. When the detector collapses 108, e.g. for transport and storage, the coils 2004\2008 are on top of each other.

When deployed, the coils 2004\2008 have to be a predetermined distance away from each other to operate properly.

The top coil 2004 consists of four hollow fiberglass rods. Each one feeds into a L-shaped holder that is zip tied to the top coil 2004. When tightening these zip ties, make sure the coil 2004 is centered to the winch mount 2104. These parts all meet in the middle into an X-shaped holder that has the main vertical fiberglass tube going through its middle.

Align the center piece correctly, so that the rope attaching the coils 2004\2008 to the winch 2700 runs through the guide hole. Make sure the coils are aligned and centered exactly. Attach the top coil 2004 to the vertical fiberglass pole 2108 by sliding it on from the top. The vertical fiberglass pole 2108 should sit on top of a bottom coil mount.

Now that the top 2004 and bottom 2008 coils are built, the detector assembly 108 needs a few more components to finish its installation, and these relate to the winch 2700.

With the top 2004 and bottom 2008 coils assembled to the fiberglass pole 2108, the winch 2700 can now be added. Handle the winch 2700 with caution. There are some sensitive electronics and mechanical switches therein that could be damaged if not careful.

Line up the winch correctly before sliding it over the vertical fiberglass winch pole 2108. There is an opening through the winch 2700 for the winch pole 2108 to slide through. Also, a set of bearings should touch the fiberglass tube when moving up and down.

The winch paracord 2408 should be coming down from the center and against the fiberglass tube. Later, attach the end of the paracord 2408 by temporarily letting the winch 2700 rest on top of the top coil 2004.

The portion of the paracord 2408 coming out of the winch 2700 will be hanging down about a foot from the bottom of the winch 2700. During assembly, feed the paracord 2408 through the guide in the top coil 2004. This guide should be directly below where the paracord comes out of the winch. With a loop on one end of the winch paracord 2408, push the loop into the slot onto a bottom coil center mount and fasten.

The winch 2700 is designed so that when the detector 108 is deployed, the distance from the center pole to the bottom of the winch 2700 to the top of a center mounting part has a predetermined range. This distance is then fine-tuned to reach optimal detection performance.

Using a top coil rope, which is separate from the paracord 2408, attach one end to the bottom of the winch 2700. There are two small holes that can be used to tie the rope with a ziptie. Add a rope weight to the top coil rope which should be able to slide on the rope. The rope weight keeps the top rope from being entangled in the various propellers of the UAV 104 when retracting the coils 2004\2008.

The other end of the top rope will be attached to a ropemount. The loop on the end of the rope should be just big enough to fit over a knob and be secured into place.

After the coils 2004\2008 are assembled to the vertical tube, a component called a top stop 2112 is added to the top of the winch pole 2108. The top stop 2112 acts to stop movement of the winch 2700 after being deployed.

First, a hole needs to be drilled at the top of the fiberglass tube. The hole must be centered. Insert an innertube part so that the horizontal thru hole in the part lines up with the hole that was just drilled.

The winch 2700 is attached to the winch mount 2104 through a screw with 2 washers, 2 lock washers, and wing nut before flight. This is used to detach the winch mount 2104 and detector 108 from the UAV 104 for easy transportation. Ensure that the winch mount 2104 is hand tight and can hinge freely to allow the detector 108 to move.

After the detector 108 is mechanically connected to the UAV 104. The detector coils 2004\2008 will need to be connected to the coils-controller box 2012.

The 12V DC/DC converter supplies power to the coils-controller box 2012. A filter board is installed to provide clean power to the box 2012. The data from the coils-controller box 2012 is collected and sent back to the GCS 106. In order to do this, a cable that is connected to a custom PCB is connected from the coils-controller box 2012 to the FC 116.

In keeping with the focus on grounding within the UAV 104, both connectors for the top and bottom coils 2004/2008 have grounding to their connecting screws as well as a connection to the utmost screw of the detector coil at the bottom coil connector, all the way up its cable and to the connector at the top coil. Accordingly, effective grounding is achieved.

The winch mount 2104 attaches the entire winch assembly to the center-core 112. As shown in FIGS. 21-22, the winch mount 2104 comprises at least a carbon tube 2204, a rodclamp 2212, and an end-cap. FIG. 22 shows another view of the winch mount 2104, comprising a rod center mount 2208 (not shown in FIG. 21), the carbon tube 2204, and the rodclamp 2212. The rodclamp 2212 comprises various 3D printed and CNC machined CF plates. It mounts the winch 2700 to the tube 2204.

The winch mount 2104 is assembled after the arms 204 are assembled onto the center plate 600. The winch mount 2104 is designed to be able to rotate independently, so that the detector 108 can swing underneath the UAV 104 during operation.

The first step is to assemble the winch mount 2104 so that it can be installed between the bottom plate 250 and middle plate 600. To do this, assemble the attachment block. This block is attached to the end of a carbon fiber tube 2204 having the predetermined length. Then, ensure that a spacer is on the tube 2204 against the block before attaching any end caps.

As shown in FIG. 23, on each end of the tube 2204 is an end cap. These end caps have a lock nut pressed into a hex cutout and placed at each end of the tube 2204. The best way to complete this step is to thread one end in and screw in until an installation rod is through the tube 2204. Cut the excess nylon threaded installation rod after assembly is complete.

The winch mount 2200 can now be assembled into the center-core 112.

As shown in FIGS. 25-27, the winch body 2700 has two carbon fiber plates that sandwich two 3D printed parts with a third 3D printed part that slides in between. Each side of the winch 2700 including the wiring will be completed before mounting the two sides together. For convenience, the two outside plates will be referred to as Side A and Side B.

As shown in FIG. 27A, the winch 2700 has a cablecover 2704 which houses a PCB and winch controller. As shown in FIGS. 27B-C, side A has the geared motor mounted thereto, inside of a gearbox 2708. Assembling side A of the winch body 2700 is achieved by mounting the geared motor inside the gearbox 2708 to the plate 2208 using bolts, lock washers, and washers.

The motor has four threaded holes in the gearbox 2708. Use an adhesive to ensure the bolts do not back out of the motor during operation. As shown in FIGS. 27B-C, the winch motor sits on the outside of the winch assembly 2700, within the gearbox 2708.

Next, assemble the winch spool 2412, which consists of two circular plates attached to opposite sides of a round drum, that are then bolted to an adapter that can be mounted to a geared motor. Mount the spool 2412 onto the shaft by pressing it tightly onto the shaft. The motor shaft will have a flat spot which should line up to the side holes on the adapter.

FIG. 24 shows the paracord 2408 wrapped clockwise around the winch 2700 with a loop on one end, and the other end fastened with zip ties. It is important to knot (verb) the end of the paracord using the knot 2404. During assembly, ensure nothing interferes with the paracord 2408.

Assembling side B of the winch body 2700 is shown in FIG. 25. First the limit switches are placed and mounted inward to the side B. Then, as shown in FIG. 26, all the wires including the power and control wires from the winch motor are fed through the hole shown under the side B and soldered to a controller. Make certain the limit switch wires do not hang as to not get stuck in the winch but leave room on the winch wires since they are routed along the outside of the winch 2700.

A 3D printed plate fits on the inside of the winch 2700 to segregate the wires from getting caught in the winch activity. Nuts can be pressed into the part so the nuts do not move when tightening.

Once assembly of both Sides A and B are completed, the two halves are assembled together with screws using flat washers, spring washers and lock nuts. Two of the screws are not supported all the way through, but instead have five bearings with flat washers separating each one from the sides A-B and adjacent bearings.

After the two sides of the winch 2700 are assembled, the wiring needs to be finished so that the winch 2700 can connect to power from the 24V DC/DC converter and get commands from the FC 116.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention.

Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

APPENDIX A: GLOSSARY

Drone Control (DC): a GCS suite of software for controlling and managing UAVs;

Electronic Speed Controller (ESC): a component which is responsible for delivering power to the motors in such a way that the UAV flies as desired;

Federal Aviation Administration (FAA): the regulatory agency in the United States responsible for regulating civil aviation, including UAV usage;

Flight Controller (FC): a component which is responsible for interfacing with external radio commands, navigation sensors, and the UAV motors to properly fly the UAV;

Fused Deposition Modeling (FDM): a common 3D-printing process where a plastic filament is melted (or fused) and placed into a desired location to create a solid object;

CNC-Computer Numerical Control: A minimum of 3-axis machine that uses a cutting tool and g-code to move to coordinates, cutting material along the way;

Global Positioning System (GPS): a worldwide satellite navigation system that is operated by the United States Space Force;

Global Navigation Satellite System (GNSS): a satellite navigation system such as GPS;

Ground Control Software (GCS): software that runs on a computer which plans tasks and issues commands to UAV to perform autonomously, such as the Drone Control;

Input/Output (IO): describes an interface between two software components or between software and hardware;

Lithium-Polymer Battery (LiPo): a energy-dense rechargeable battery composed from lithium ions and polymer electrolyte;

Mission: a predetermined task which is sent to an autonomous UAV for completion, such as flying to a set of coordinates and scanning for metallic objects;

Polyethylene Terephthalate Glycol-Modified (PETG): a plastic that is slightly modified from the commonly used plastic Polyethylene Terephthalate (commonly used in disposable plastic bottles) for use in FDM;

Printed Circuit Board (PCB)—an electronic assembly that uses conductors to create electrical connections between components;

Receiver (RX): a component that receives commands or data from radio waves;

Remote Control (RC): denotes a device which is controlled via a physically unconnected device called a controller (aka TX), typically through radio waves;

Transmitter (TX): a component which sends data in the form of a radio signal; and (small) Unmanned Aerial System (SUAS): as defined by the FAA, an unmanned system responsible for flying an unmanned aeronautical vehicle (which weighs no more than 55 lbs), plus the ground station and transmitters responsible for operating the aircraft.

APPENDIX B

3D-Printed Part Fabrication

Several parts of the system 100 are created with FDM 3D Printing. A slicer is recommended and maybe necessary for slicing and build preparation of STL files. Some of the parts may need to be re-oriented in the slicing software for a successful build. The vast majority of parts for the UAV were designed to be manufactured using 3D Printing and will have no overhangs or supports necessary. Support is required for a few parts where changing orientation still results in a large overhang that cannot be supported.

The parts herein should be printed with PETG filament because of its great mechanical properties. PLA can be used for non-critical parts like drill guides and fixtures. Filament should be stored in a cool, dry place. If in a humid environment (e.g. Florida), the filament should be placed in a filament dryer or other dehumidifying device for at least 12 hours (preferably 24 hours) before printing.

FIG. 28 shows a table with a general overview of recommended slicer settings that are used in fabricating various components described herein.

CNC Milling Fabrication

The UAV 104 comprises numerous CNC milled plates made from carbon fiber sheets. These will be formatted by DXF and GCODE files. DXF files will need to be processed through a CAM program to generate toolpaths. The GCODE files can be set up to run on, for example, Mach3 control software, using a variety of spindle speeds and feed rates.

What is claimed is:

1. A method of assembling an unmanned aerial vehicle (UAV) for use in detecting unexploded ordnance (UXO), comprising: arranging four rectangular arms of the UAV into an X-patterned frame; further constructing the frame to have a plurality of plates at the center of the X-pattern, the plates being in parallel with each other and horizontal to the ground; positioning the plurality of parallel plates to secure the four rectangular arms together and hold a plurality of electronic components and forming a center core; positioning a flight controller (FC), an RFD modem, a GPS unit, a front sensor hub, and a main battery within the center core; constructing a UXO detector of an upper coil, lower coil, and winch; attaching the UXO detector to the frame; attaching a winch for raising and lowering the UXO detector; locating a winch mount between a bottom plate and a middle plate within the center core; and attaching a winch assembly to the center core via the winch mount; configuring the winch so that the upper coil can either be retracted up to the center core, or extended away from the UAV to a predetermined distance; constructing the top coil material to have smaller diameter than the bottom coil, but have the same length and width as the bottom coil: when the UXO detector is deployed, the coils are a predetermined distance away from each other; and when the UXO detector is folded or collapsed for transport\storage, the upper/lower coils are touching each other.

2. The method of claim 1, further comprising:
arranging the rectangular arms to have two motors spinning clockwise and two motors spinning counter-clockwise.

3. The method of claim 1, further comprising:
arranging that the winch to be attached and detached to allow easier transport during non-use of the UAV; and attaching the winch to the UXO detector.

4. The method of claim 1, further comprising:
configuring an effective depth of the UXO detector to be less than or equal to 3 meters.

5. The method of claim 1, further comprising:
arranging the middle center plate for providing electrical grounding to all the parts mounted thereto;
locating a grounding Printed Circuit Board (PCB) between a nut holder and the bottom plate, thereby increasing ground-path current and reducing electromagnetic interference (EMI).

6. The method of claim 1, further comprising:
mounting the GPS unit to an extension riser to locate it above the UAV thereby reducing electrical interference and allowing the GPS unit to work more effectively.

7. The method of claim 1, further comprising:
configuring the UXO detector to communicate UXO data to a ground control station (GCS).

8. The method of claim 7, further comprising:
configuring the sensor hub with a rangefinder;
mounting the sensor hub on the front of the UAV at an angle so that it can see ahead of the UAV; and
configuring the sensor hub for altering the flight-altitude of the UAV to stay a consistent level of the landscape.

9. The method of claim 1, further comprising: configuring the UXO detector for preserving a fixed distance between the upper coil and the lower coil when the UXO detector is operating by communicating with a coils controller box to operate the winch.

10. The method of claim 9, further comprising:
assembling all hardware around the upper and lower coils using plastic or nylon screws to increase reading accuracy.

11. The method of claim 1, further comprising:
mounting the RFD modem to a bottom side of a top plate with its heat sink facing down and away from the top plate and a plurality of antenna connections facing outward from the center core.

12. The method of claim 11, further comprising:
electrically connecting the RFD modem to the FC.

13. The method of claim 12, further comprising:
arranging a plurality of antennas withing the RFD modem to always stand vertical and be parallel with each other.

14. The method of claim 12, further comprising:
positioning a coils controller box for controlling the upper and lower coils within the center core; and
configuring a customized cable to be connected to a customized PCB within the coils-controller box to the FC.

* * * * *